US010031758B2

(12) United States Patent
Zappulla et al.

(10) Patent No.: US 10,031,758 B2
(45) Date of Patent: Jul. 24, 2018

(54) CHAINED-INSTRUCTION DISPATCHER

(71) Applicant: Netronome Systems, Inc., Santa Clara, CA (US)

(72) Inventors: Frank J. Zappulla, Charlton, MA (US); Steven W. Zagorianakos, Brookline, NH (US); Rajesh Vaidheeswarran, Northborough, MA (US)

(73) Assignee: Netronome Systems, Inc., Santa Clara, CA (US)

( * ) Notice: Subject to any disclaimer, the term of this patent is extended or adjusted under 35 U.S.C. 154(b) by 817 days.

(21) Appl. No.: 14/231,028

(22) Filed: Mar. 31, 2014

(65) Prior Publication Data

US 2015/0277924 A1   Oct. 1, 2015

(51) Int. Cl.
*G06F 9/38*    (2018.01)
*G06F 9/30*    (2018.01)
*G06F 9/48*    (2006.01)
*G06F 21/72*   (2013.01)

(52) U.S. Cl.
CPC .......... *G06F 9/3851* (2013.01); *G06F 9/3836* (2013.01); *G06F 9/4881* (2013.01); *G06F 21/72* (2013.01)

(58) Field of Classification Search
CPC .... G06F 9/3836; G06F 9/3851; G06F 9/4881; G06F 9/30178; G06F 21/123; G06F 21/72

See application file for complete search history.

(56) References Cited

U.S. PATENT DOCUMENTS

| 6,560,695 | B1 * | 5/2003 | Heaslip | G06F 9/3836 |
| | | | | 712/214 |
| 6,789,147 | B1 * | 9/2004 | Kessler | H04L 63/166 |
| | | | | 710/200 |
| 9,304,775 | B1 * | 4/2016 | Lindholm | G06F 9/3836 |
| 2009/0070553 | A1 * | 3/2009 | Wallach | G06F 9/30185 |
| | | | | 712/34 |
| 2015/0106595 | A1 * | 4/2015 | Khot | G06F 9/3836 |
| | | | | 712/215 |

* cited by examiner

*Primary Examiner* — Aimee Li
*Assistant Examiner* — Courtney Carmichael-Moody
(74) *Attorney, Agent, or Firm* — Imperium Patent Works LLP; T. Lester Wallace; Mark D. Marrello

(57) ABSTRACT

A dispatcher circuit receives sets of instructions from an instructing entity. Instructions of the set of a first type are put into a first queue circuit, instructions of the set of a second type are put into a second queue circuit, and so forth. The first queue circuit dispatches instructions of the first type to one or more processing engines and records when the instructions of the set are completed. When all the instructions of the set of the first type have been completed, then the first queue circuit sends the second queue circuit a go signal, which causes the second queue circuit to dispatch instructions of the second type and to record when they have been completed. This process proceeds from queue circuit to queue circuit. When all the instructions of the set have been completed, then the dispatcher circuit returns an "instructions done" to the original instructing entity.

24 Claims, 20 Drawing Sheets

USER DOWNLOADS INFORMATION FROM A
BANK'S WEB SERVER

FOR THE SSL SESSION THE SERVER AND CLIENT NEGOTIATE THE FOLLOWING:
1) USE AES CYPHER IN CDC MODE FOR ENCRYPTION
2) USE HMAC HASH CODE AND SHA1 ALGORITHM FOR MESSAGE AUTHENTICATION

BANK'S WEB SERVER MACHINE

NETWORK FLOW PROCESSOR OF
THE NETWORK INTERFACE DEVICE

INGRESS PCIe ISLAND

CRYPTO ISLAND

ME ISLAND

MU ISLAND

MAC ISLAND
(EGRESS)

COMMAND/PUSH/PULL (CPP) DATA BUS STRUCTURE

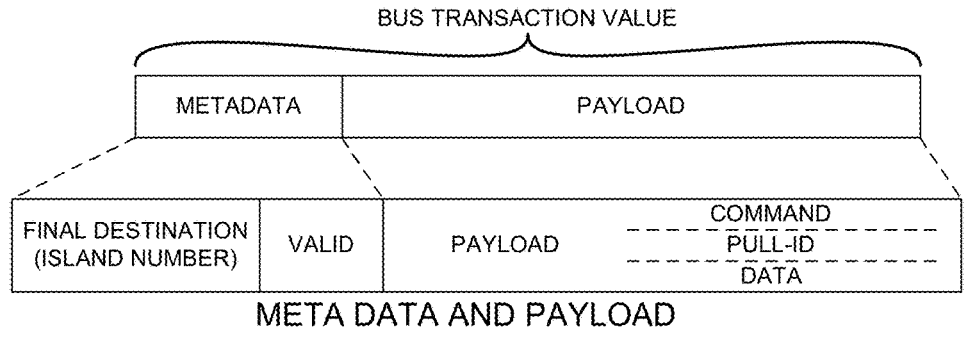

META DATA AND PAYLOAD

FIG. 15

| FIELD | WIDTH | DESCRIPTION |
|---|---|---|
| TARGET | 4 | CPP TARGET FOR THE COMMAND. |
| ACTION | 5 | ACTION RECOGNIZED BY THE CPP TARGET INDICATING WHAT SHOULD BE PERFORMED. |
| TOKEN | 2 | SUBTYPE OF ACTION RECOGNIZED BY THE CPP TARGET, INDICATING THE FLAVOR OF THE COMMAND. |
| LENGTH | 5 | LENGTH OF THE COMMAND, DEPENDENT ON THE ACTION/TOKEN, INTERPRETED BY THE CPP TARGET. |
| ADDRESS | 40 | ADDRESS THAT THE COMMAND SHOULD OPERATE ON. |
| BYTE_MASK | 8 | FURTHER OPTIONS OF A COMMAND (A BYTE MASK). |
| DATA_MASTER_ISLAND | 6 | ISLAND OF DATA MASTER TO PULL/PUSH DATA FROM/TO. |
| DATA_MASTER | 4 | REFERENCE INDICATING TO THE DATA MASTER WHERE TO PUSH/PULL FROM. |
| DATA_REF | 14 | PUSH-PULL ID REFERENCE INDICATING TO THE DATA MASTER WHERE TO PUSH/PULL FROM. |
| SIGNAL_MASTER | 10 | EXTENSION FOR DATA_REF AS A DATA MASTER ONLY; FOR OTHER MASTERS INDICATING WHICH MASTER WITHIN THE DATA MASTER'S ISLAND SHOULD BE SIGNALED FOR THE COMMAND. |
| SIGNAL_REF | 7 | REFERENCE WITHIN THE SIGNAL MASTER AS TO WHEN SIGNAL SHOULD BE INDICATED WITH THE COMMANDS PULL OR PUSH. |

COMMAND PAYLOAD

FIG. 16

| FIELD | WIDTH | DESCRIPTION |
|---|---|---|
| TARGET_ISLAND | 6 | ISLAND TO RETURN PULL DATA TO. |
| TARGET_PORT | 2 | IDENTIFIES THE SUB-CIRCUIT IN THE FINAL DESTINATION ISLAND THAT IS THE TARGET (OF A MULTI-TARGET ISLAND). |
| TARGET_REF | 14 | TARGET SPECIFIC REFERENCE; RETURNED WITH PULL DATA. |
| DATA_MASTER | 4 | PULL-ID WITHIN THE ISLAND OF DATA MASTER TO PULL DATA FROM. |
| DATA_REF | 14 | REFERENCE WITHIN THE DATA MASTER AS TO WHERE TO PULL FROM; NORMALLY COPIED FROM THE INVOKING COMMAND. |
| SIGNAL_MASTER | 8 | EXTENSION FOR DATA_REF AS A DATA MASTER ONLY; FOR OTHER MASTERS INDICATING WHICH MASTER WITHIN THE DATA MASTER'S ISLAND SHOULD BE SIGNALED WHEN THE LAST DATA IS PULLED. |
| SIGNAL_REF | 7 | REFERENCE USABLE BY THE MASTER TO DETERMINE WHICH SIGNAL SHOULD BE INDICATED WITH THE LAST PULL DATA. |
| LENGTH | 5 | NUMBER OF 64-BIT DATA WORDS TO PULL FROM THE DATA MASTER, STARTING AT THE SPECIFIED DATA_REF. |

PULL-ID PAYLOAD

FIG. 17

| FIELD | WIDTH | DESCRIPTION |
|---|---|---|
| DATA_IS_PULL | 1 | ASSERTED FOR PULL DATA. |
| DATA_MASTER_OR_TARGET_PORT | 4 | DATA MASTER FOR PUSH DATA OR TARGET PORT FOR PULL DATA. |
| DATA_OR_TARGET_REF | 14 | DATA REF FOR PUSH DATA OR TARGET REF FOR PULL DATA. |
| SIGNAL_MASTER | 8 | ONLY USED FOR PUSH DATA; MASTER IN ISLAND TO SIGNAL IF DATA_MASTER IS NOT CTM; EXTENSION OF DATA_REF FOR DATA_MASTER OF CTM. |
| SIGNAL_REF_OR_CYCLE | 7 | SIGNAL_REF FOR PUSH DATA OR CYCLE FOR PULL DATA. |
| LAST | 1 | ASSERTED WITH THE LAST WORD OF DATA FOR PULL OR PUSH DATA. |
| DATA | 64 | 64-BITS OF PULL/PUSH DATA. |
| DATA_ERROR | 2 | ONE BIT PER 32-BITS OF DATA TO INDICATE AN UNCORRECTABLE ERROR. |
| DATA_VALID | 2 | ONE BIT PER 32-BITS OF DATA TO INDICATE, ON PUSH, THAT THE DATA IS TO BE WRITTEN TO THE DATA_MASTER. |
| NO_SPLIT | 1 | FOR PUSH DATA ONLY, ASSERTED FOR SIGNALING TO INDICATE THAT BOTH SIGNAL_REF AND SIGNAL_REF1 ARE TO BE INDICATED TO THE SIGNALED MASTER. |

DATA PAYLOAD

FIG. 18

| FIELD | WIDTH | DESCRIPTION |
|---|---|---|
| DATA_IS_PULL | 1 | ASSERTED FOR PULL DATA. |
| TARGET_PORT | 2 | IDENTIFIES THE SUB-CIRCUIT IN THE FINAL DESTINATION ISLAND THAT IS THE TARGET (OF A MULTI-TARGET ISLAND). |
| TARGET_REF | 14 | TARGET SPECIFIC REFERENCE, RETURNED WITH PULL DATA. |
| CYCLE-OF_PULL | 7 | CYCLE OF PULL DATA. |
| LAST | 1 | ASSERTED WITH THE LAST WORD OF PULL DATA. |
| DATA | 64 | 64-BITS OF PULLED DATA FROM THE DATA MASTER. |
| DATA_ERROR | 2 | ONE BIT PER 32-BITS OF PULLED DATA TO INDICATE AN UNCORRECTABLE ERROR FROM THE DATA_MASTER DATA SOURCE. |

DATA PAYLOAD (FOR A PULL)

FIG. 19

| FIELD | WIDTH | DESCRIPTION |
|---|---|---|
| DATA_IS_PULL | 1 | DEASSERTED FOR PUSH DATA. |
| DATA_MASTER | 4 | PUSH ID WITHIN THE ISLAND OF DATA MASTER THE DATA IS DESTINED FOR. |
| DATA_REF | 14 | REFERENCE WITHIN DATA MASTER AS TO WHERE TO PUSH FROM. |
| SIGNAL_MASTER | 8 | FOR CTM AS A DATA MASTER ONLY THIS IS AN EXTENSION FOR DATA_REF; FOR OTHER MASTERS INDICATING WHICH MASTER WITHIN THE DATA MASTER'S ISLAND SHOULD BE SIGNALED WHEN THE LAST DATA IS PUSHED. |
| SIGNAL_REF | 7 | REFERENCE WITHIN THE SIGNAL MASTER AS TO WHICH SIGNAL SHOULD BE INDICATED WITH THE LAST PUSH DATA. |
| LAST | 1 | ASSERTED WITH THE LAST WORD OF PUSH DATA. |
| DATA | 64 | 64-BITS OF PUSH DATA FROM THE DATA MASTER. |
| DATA_ERROR | 2 | ONE BIT PER 32-BITS OF PUSHED DATA TO INDICATE AN UNCORRECTABLE ERROR FROM THE DATA_MASTER DATA SOURCE. |
| DATA_VALID | 2 | ONE BIT PER 32-BITS OF DATA TO INDICATE THAT THE DATA IS TO BE WRITTEN TO THE DATA_MASTER. |
| NO_SPLIT | 1 | ASSERTED FOR SIGNALING TO INDICATE THAT BOTH SIGNAL_REF AND SIGNAL_REF1 ARE TO BE INDICATED TO THE SIGNALED MASTER. |

DATA PAYLOAD (FOR A PUSH)

FIG. 20

HTTP MESSAGE PASSING FROM THE SERVER, THROUGH
IB-NFP, AND TO CLIENT NETWORK DEVICE

CHAINED-INSTRUCTION DISPATCHER

TECHNICAL FIELD

The described embodiments relate generally to the dispatching of instructions to multiple processing engines.

BACKGROUND INFORMATION

In some networking applications, an overall networking processing job may be performed by having a first processing engine do a first part of the job, then having a second processing engine do a second part of the job, and then having a third processing engine do a third part of the job, and so forth. The part of the job performed by the various processing engines may have to be performed in a sequence because the result of an earlier part of the job may impact or be necessary for carrying out a later part of the job. An instructing processor may initially determine the overall job to be performed. The instructing processor may then orchestrate how the various processing engines carry out the sub-parts of the overall processing job by issuing appropriate instructions to the various processing engines at the correct times so that the overall job is performed.

SUMMARY

A chained-instruction dispatcher circuit includes an instruction loader and multiple queue circuits. In one example, the chained-instruction dispatcher circuit includes no code-executing processor that fetches and executes instructions, but rather is an amount of dedicated hardwired digital logic. An instructing entity, such as an orchestrating processor, sends a set of instructions to the dispatcher circuit. In one example there are three types of instructions. For instructions of the set, the instruction loader forwards those instructions of the first type to a first queue circuit. Any such instructions are pushed into an instruction queue circuit within the first queue circuit. Similarly, for instructions of the set, the instruction loader forwards instructions of the second type to a second queue circuit. Any such instructions are pushed into an instruction queue circuit within the second queue circuit. Similarly, for instructions of the set, the instruction loader forwards instructions of the third type to a third queue circuit. Any such instructions are pushed or otherwise loaded into an instruction queue circuit within the third queue circuit.

In accordance with a "dispatch rule", the first queue circuit dispatches instructions of the set that are of the first type to one or more processing engines. The processing engines then carry out the instructions. As the instructions of the first type of the set are completed, the processing engines return "instruction done" signals back to the first queue circuit. For each instruction dispatched, the first queue circuit receives a return "instruction done" signal. The return instruction done signal may cause a done bit within the first queue circuit to be set, where the done bit stores the completion status of a corresponding instruction. An instruction may be present in the queue circuit but may not yet have been dispatched, or an instruction may be present in the queue circuit and may have been dispatched but not yet completed, or an instruction may be present in the queue circuit and may have been dispatched and may have been completed. In accordance with a "go rule", when the first queue circuit determines that all the dispatched instructions of the first type have been completed, then the first queue circuit sends a "go signal" to the second queue circuit. The "go signal" indicates to the second queue circuit that the second queue circuit should then dispatch its stored instructions of the set that are of the second type. Once the go signal has been sent, then storage locations in the instruction queue circuit that were previously used to store instructions of the set are freed up for use in storing other instructions from the instruction loader.

In accordance with a dispatch rule, the second queue circuit dispatches instructions of the set that are of the second type. One or more processing engines perform the instructions. When a processing engine completes carrying out one of the instructions it returns an "instruction done" signal back to the second queue circuit. In accordance with a "go rule", when the second queue circuit determines that all the dispatched instructions of the second type have been completed, then the second queue circuit sends a go signal to the third queue circuit. The go signal indicates to the third queue circuit that the third queue circuit should then dispatch its stored instructions of the set that are of the third type. Once the go signal has been sent, then storage locations in the instruction queue circuit that were previously used to store instructions of the set are freed up for use in storing other instructions from the instruction loader.

In accordance with a dispatch rule, the third queue circuit dispatches instructions of the set that are of the third type. One or more processing engines perform the instructions. When a processing engine completes carrying out one of the instructions it returns an "instruction done" signal back to the third queue circuit. As in the case of the first two queue circuits, the third queue circuit may involve multiple done bits, where each done bits stores the completion status of a corresponding instructions. In accordance with a "go rule", when the third queue circuit determines that all the dispatched instructions of the set that are of the third type have been completed, then the chained-instruction dispatcher returns an "instructions done" indication back to the instructing entity. The "instructions done" indication indicates to the instructing entity that all the instructions of the set have been completed. Once the "instruction done" indication has gone out, then storage locations in the instruction queue circuit that were previously used to store instructions of the set are freed up for use in storing other instructions from the instruction loader.

In some embodiments, the chained-instruction dispatcher circuit receives sets of instructions from each of multiple different instructing entities. Each of the sets is received onto the chained-instruction dispatcher circuit via the same bus. When the instructions of a set are determined by the chained-instruction dispatcher circuit to have been completed, then the chained-instruction dispatcher circuit returns an "instructions done" indication back to the particular instructing entity that originally issued the set of instructions. The "instructions done" indication is returned via the same bus.

In some embodiments, a queue circuit of the chained-instruction dispatcher circuit dispatches instructions to multiple different processing engines. Regardless of which processing engine performs the instruction, that processing engine returns an "instruction done" signal back to the dispatching queue circuit when the instruction has been completed so that the queue circuit can then record completion of the instruction. Some queue circuits can dispatch instructions to multiple processing entities, whereas other queue circuits can dispatch instructions only to one processing entity. In some embodiments, the queue circuits dispatch instructions to processing engines via direct one-to-one connections. In other embodiments, the queue circuits dispatch instructions to processing engines across one or more buses. In some embodiments the "dispatch rule" employed by a queue circuit is fixed and cannot be changed, whereas in other embodiments the "dispatch rule" is programmable. Likewise, in some embodiments the "go rule" employed by a queue circuit is fixed and cannot be changed, whereas in other embodiments the "go rule" is programmable.

In some embodiments the queue circuits are self-packing, whereas in other embodiments the queue circuits are not self-packing.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 15 is a diagram that shows the high-level format of a CPP bus transaction value.

FIG. 16 is a diagram that shows the various parts of the payload portion of a CPP bus transaction value in the case where the CPP bus transaction value is a command communicated across the command mesh.

FIG. 17 is a diagram that shows the various parts of the payload portion of a CPP bus transaction value in the case where the CPP bus transaction value is a pull-id communicated across the pull-id mesh.

FIG. 18 is a diagram that shows the payload portion of the CPP bus transaction value in the case where the CPP bus transaction value is a data value communicated across the data mesh.

FIG. 19 is a diagram that shows the payload portion of a data CPP bus transaction value communicated across a data mesh in the case of a data pull.

FIG. 20 is a diagram that shows the payload portion of a data CPP bus transaction value communicated across a data mesh in the case of a data push.

DETAILED DESCRIPTION

Reference will now be made in detail to some embodiments of the invention, examples of which are illustrated in the accompanying drawings.

Figure 1:
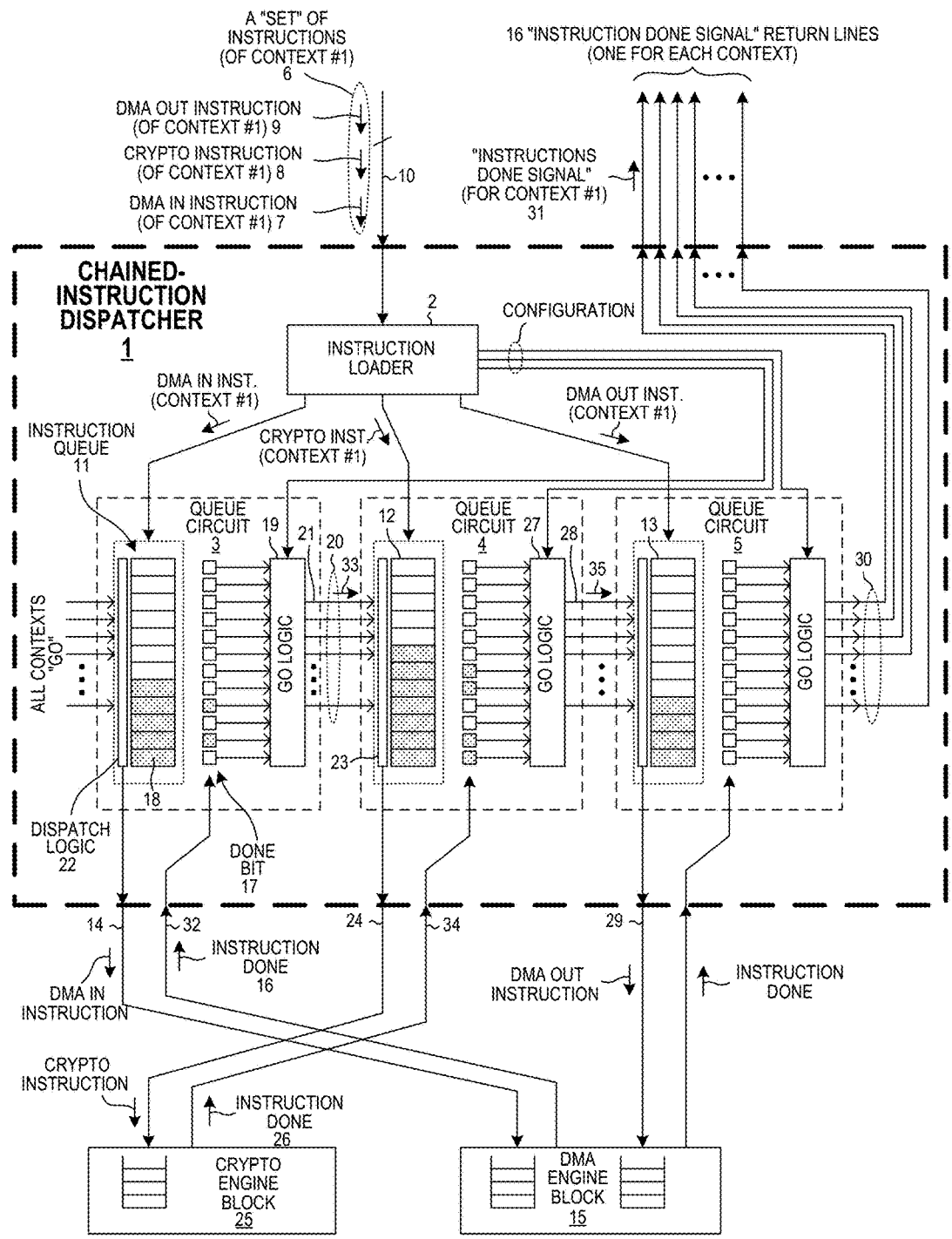
FIG. 1 is a diagram of a chained-instruction dispatcher circuit 1 in accordance with one novel aspect.

FIG. 1 is a diagram of one specific embodiment of a chained-instruction dispatcher circuit 1 in accordance with one novel aspect. Instruction dispatcher circuit 1 includes an instruction loader 2, and three queue circuits 3-5. The instruction loader receives multiple sets of instructions from one or more instructing entities. An instructing entity may, for example, be a processor that sends a set of instructions to the instruction dispatcher circuit 1 via a bus. The instructions of each set are of the same "context". In the present example, each instruction includes a context field (also called a set field) that contains a value (a context ID value), where the value indicates the context. The context effectively identifies the instructing entity that issued the set of instructions. Instructions for many different contexts are typically being handled by chained-instruction dispatcher circuit 1 at a given time and are in the process of being dispatched to processing engines and being completed by the processing engines.

Each instruction, in addition to having a context field that indicates its context, also has a type field that indicates its instruction type. In the present example, there are three instruction types. In the example of FIG. 1, a set 6 of three instructions 7, 8 and 9 is received via conductors 10 into the instruction loader 2, where all of the instructions are for the same context (context #1) as indicated the values in the context fields of the instructions. The first instruction 7 is of a first type as indicated by the value in its type field. The second instruction 8 is of a second type as indicated by the value in its type field. The third instruction 9 is of a third type as indicated by the value in its type field. The instruction loader 2 uses the type values of incoming instructions to forward instructions of the first type to the first queue circuit 3 so that such instructions are pushed into the instruction queue circuit 11 of the first queue circuit 3. Similarly, the instruction loader 2 uses the type values of incoming instructions to forward instructions of the second type to the second queue circuit 4 so that such instructions are pushed into the instruction queue circuit 12 of the second queue circuit 4. The instruction loader 2 forwards instructions of the third type to the third queue circuit 4 so that such instructions are pushed into the instruction queue circuit 13 of the third queue circuit 4. Each of the instruction queue circuits 11-13 typically stores instructions of several different contexts.

Each queue circuit has a dispatch logic circuit portion. Dispatch logic 22 of the first queue circuit 3 dispatches instructions of a context via output conductors 14 to a processing engine (DMA engine block) 15 in the order in which the instructions are received onto the queue circuit 3. The dispatch logic 22 employs a "dispatch rule" to determine which instructions to dispatch and when. In the present example, the "dispatch" rule dictates that the queue circuit 3 is to dispatch up to three pending instructions to a processing engine so that at most three instructions are being processed by the processing engine 15 at a given time, where the instructions are dispatched in the order in which the instructions were received into the first queue circuit 3.

The instruction queue circuit 11 may store instructions that have not yet been dispatched, instructions that have been dispatched but are not yet indicated as having been completed, and instructions that have been dispatched and are indicated as having been completed. For each instruction stored in the instruction queue circuit of the first queue circuit, there is a corresponding "done bit". The content of the done bit indicates whether the corresponding instruction in the instruction queue circuit has been completed. In the example of FIG. 1, the bottom done bit 17 is the done bit for the bottom slot in the instruction queue circuit 11 that contains the corresponding instruction. The corresponding instruction in this example is the first instruction 7. When an instruction is received onto the instruction queue circuit 11 and then later is dispatched, the instruction has not yet been completed, so its done bit is initially not set. The dispatched instruction is supplied to the processing engine 15 via conductors 14. The processing engine 15 responds by performing an operation as indicated by the instruction. When the operation has been completed, then the processing engine 15 returns an "instruction done" indication signal 16 back to the first queue circuit 3 via conductors 32. This "instruction done" indication signal 16 causes the "done bit" 17 for the dispatched instruction 7 to be set. Multiple instructions of a given context can be dispatched in this way in accordance with the dispatch rule to the processing engine 15 at a given time, where the operations indicated by these multiple instructions have not yet been completed, and where the done bits for the instructions have not yet been set. One by one, "instruction done" indication signals are returned to the first queue circuit 3 via conductors 32 for the instructions of a context, and one by one the done bits for theses instructions are set.

Each of the queue circuits also has a go logic circuit. The "go logic" circuit 19 of the first queue circuit 3 examines the values of the "done bits" and applies a "go rule" to determine when to assert a "go signal" for each context. In the present example, the "go rule" dictates that when all the "done bits" for all the instructions of a context stored in instruction queue circuit 11 are set, then the go logic 19 shall output a "go signal" for the context. There are sixteen contexts that can be active at a given time. Accordingly, there are sixteen conductors 20 extending from the "go logic" 19 that can carry go signals, one for each context. In the example of FIG. 1, there is only one instruction of the first type for context #1 that was stored in the instruction queue circuit 11. Accordingly, when instruction 7 is dispatched and the instruction done signal 16 is later returned by processing engine 15, then the "go logic" 19 determines that all instructions of context #1 have been completed and the "go logic" asserts a go signal 33 for context #1 onto conductor 21. When the "go signal" 33 is asserted, then the done bits for the instructions for context #1 of the set 6 are cleared, and the corresponding slots in the instruction queue circuit 11 are made available for storing new instructions.

The dispatch logic 23 of the second queue circuit 4 receives the "go signals" output by the first queue circuit 3. If the go signal for a context is asserted, then the dispatch logic 23 applies the "dispatch rule" and causes instructions of the context stored in the instruction queue circuit 12 of the second queue circuit 4 to be dispatched. In the present example, any instructions of set 6 (of context #1) that are stored in the instruction queue circuit 12 of the second queue circuit 4 are dispatched via conductors 24 in the order that the instructions were received onto the second queue circuit 4. Instructions dispatched by the second queue circuit 4 are supplied to processing engine 25. As in the case of the first queue circuit, there is a done bit for each instruction stored in the instruction queue circuit 12. From the time an instruction is received up until it is dispatched, its done bit is not set. When the processing engine 25 has completed carrying out the operation indicated by the instruction, then the processing engine 25 returns an "instruction done" indication signal 26 via conductors 34 to the second queue circuit for the instruction. The "instruction done" indication signal 26 in turn causes the done bit for the instruction to be set. In the present example, there is only one instruction for context #1 stored in the instruction queue circuit 12 of the second queue circuit 4. When this instruction 8 has been completed, the processing engine 25 returns the instruction done signal 26 to the second queue circuit. The "go logic" 27 of the second queue circuit 4 monitors the done bits and outputs "go signals" to the third queue circuit 5 in accordance with a "go rule". The go rule dictates that when all "done bits" for all the instructions of a set (of context #1) in instruction queue circuit 12 are set, then the go logic 27 shall assert a go signal for the context. In the example of FIG. 1, there is only one instruction 8 of the second type for context #1 stored in the instruction queue circuit 12 of second queue circuit 4, so when the done indication for this instruction 8 results in the done bit for instruction 8 being set, then the go logic 27 asserts a "go signal" 35 for context #1 on conductor 28 to the third queue circuit 5. The done bits for the instructions of context #1 (in the second queue circuit) are cleared, and the slots in the instruction queue circuit 12 of the second queue circuit 4 that were occupied by instructions of the set 6 are now made available for storing new instructions.

The third queue circuit 5 works in similar fashion to the way the first and second queue circuits work, except that the third queue circuit 5 dispatches instructions to processing engine 15 via conductors 29, and except that the third queue circuit 5 supplies its output "go signals" via conductors 30 out of the chained-instruction dispatcher circuit 1. One "go signal" can be output for each of the sixteen contexts. The "go signals" output by the last queue circuit of the instruction dispatcher, in this case the third queue circuit, are also referred to here as "instructions done" signals, with the word "instructions" in the plural to indicate that all of the instructions of the set have been completed. Instructions are said to be dispatched by the chained-instruction dispatcher circuit 1 in a "chained" fashion, because all the instructions of the set 6 of the first type must be indicated as having been completed before any instructions of the set 6 of the second type are dispatched, and because all the instructions of the set 6 must be indicated as having been completed before any instructions of the set 6 of the third type are dispatched, and so forth. The dispatching and processing of the instructions is therefore chained. When all the instructions of the set 6 are indicated as having been completed, then the chained-instruction dispatcher circuit 1 outputs a single "instructions done" signal 31 for the context (the context as indicated by the context field of the instructions of the set).

An indication that all the instructions of the set have been completed is then returned to the instructing entity that originally issues the set 6 of instructions. For example, the instructions done signal 31 can be returned to the instructing entity. Alternatively, a signal derived from the instructions done signal 31 can be returned. In one example, each instructing entity supplies instructions of a different and unique context to the chained-instruction dispatcher circuit 1 across a bus, and the "instructions done" signal for a particular context is returned to the particular instructing entity that issues instructions of that context, where the "instructions done" signal is communicated across a bus back to the instructing entity.

Figure 2:
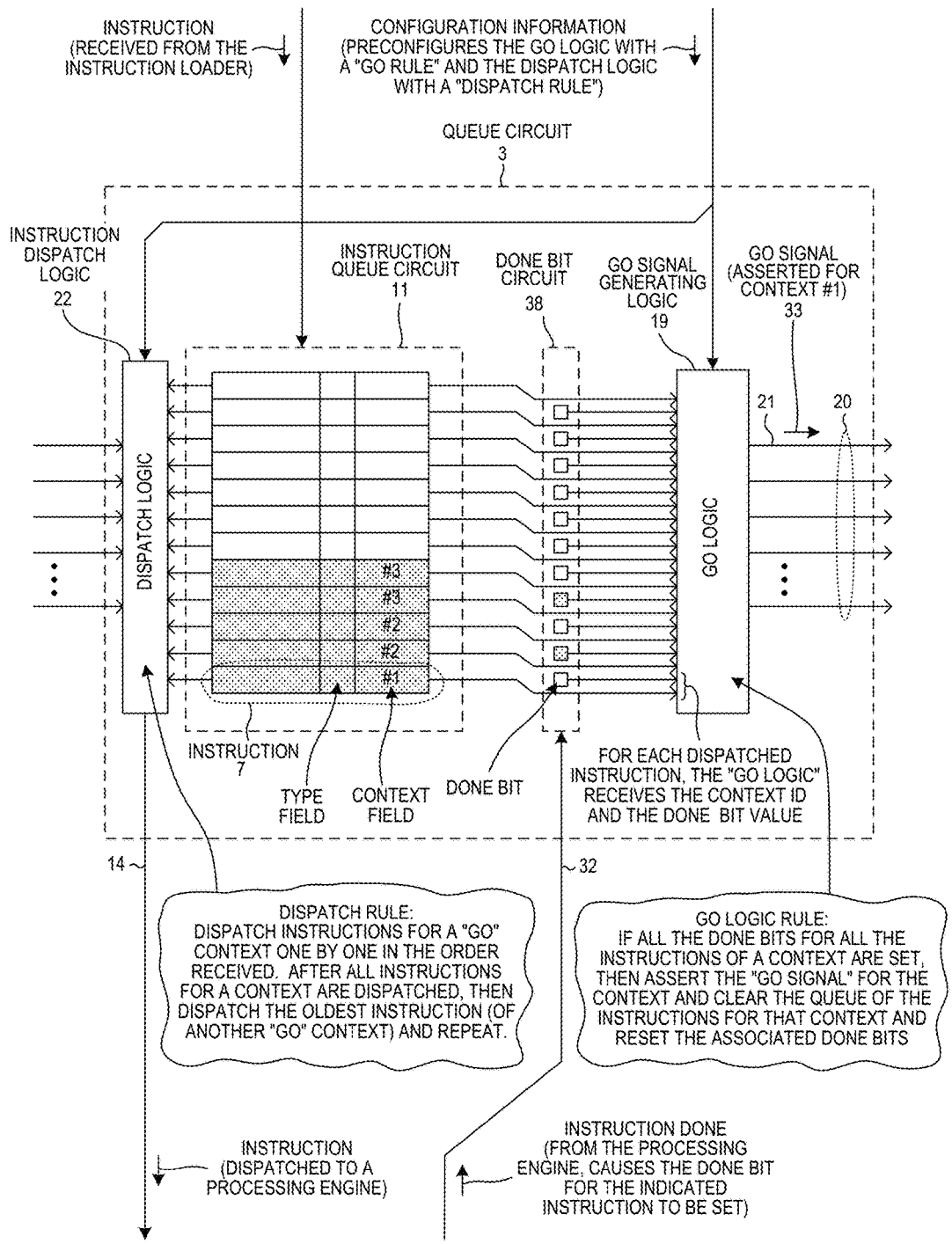
FIG. 2 is a more detailed diagram of the first queue circuit 3 within the chained-instruction dispatcher circuit 1 of FIG. 1.

FIG. 2 is a more detailed diagram of one particular non-limiting example of the first queue circuit 3 of the chained-instruction dispatcher circuit 1 of FIG. 1. This particular example is presented here just for instructional and illustrative purposes. There are many ways of realizing a queue circuit of the novel chained-instruction dispatcher circuit. In the present example of FIG. 2, the "dispatch rule" employed by the dispatch logic of each queue circuit is independently programmable. A configuration instruction of a particular form received by the instruction loader 2 does not result in an instruction being pushed into an instruction queue circuit, but rather the configuration instruction causes configuration information to be sent from the instruction loader and into the dispatch logic of a particular queue circuit identified by the instruction. Likewise, the "go rule" employed by the go logic of each queue circuit is independently programmable. Another configuration instruction of a particular form received by the instruction loader 2 does not result in an instruction being pushed into an instruction queue circuit, but rather the configuration instruction causes configuration information to be sent from the instruction loader and into the go logic of a particular queue circuit identified by the instruction. In other embodiments, the dispatch and go rules employed are hardwired and are not programmable. In one example, to realize an example of the circuitry of FIG. 2, the function of the each circuit block of FIG. 2 is described in a hardware description language (for example, Verilog or VHDL), as are the blocks of the remainder of the chained-instruction dispatcher circuit, and then a commercially available hardware synthesis program (for example, Synopsis Design Compiler) is employed to generate digital logic circuitry from the hard description language description, where the synthesized digital logic circuitry performs the function described by the hardware description language.

In the example of FIG. 1, all instructions dispatched by the first queue circuit 3 are dispatched to one processing entity (DMA engine block 15) due to hardwired connections 14, and all instructions dispatched by the second queue circuit 4 are dispatched to one processing entity (crypto engine block 25) due to hardwired connections 24, and all instructions dispatched by the third queue circuit 5 are dispatched to one processing entity (DMA engine block 15) due to hardwired connections 29. A queue circuit need not, however, only dispatch instructions to one processing entity in all embodiments. In other embodiments, a dispatching queue circuit dispatches instructions onto a bus such that the instructions are communicated via the bus to an indicated one of several processing engines. When the indicated processing engine completes an instruction, then the indicated processing engine returns an "instruction done" indication signal via the bus back to the dispatching queue circuit that originally put the instruction onto the bus. In this way, a single dispatching queue circuit can dispatch instructions to multiple processing engines.

Similarly, in the example of FIG. 1, all the sets of instructions are received from a single instructing entity, and all the "instructions done" signals are returned back to the same single instructing entity. This need not, however, be the case in all embodiments. In other embodiments, each one of a plurality of different instructing entities sends sets of instructions to the chained-instruction dispatcher circuit 1 via the same bus. When all the instructions of a set sent by a particular instructing entity have been completed by the appropriate processing entities, then the chained-instruction dispatcher circuit 1 sends an "instructions done" signal back to the particular instructing entity via the same bus. In the particular example of FIG. 1, the bus via which the chained-instruction dispatcher circuit 1 receives sets of instructions is a Command/Push/Pull (CPP) bus, but this is just one example. Any other type of suitable bus can be employed to carry out the necessary communication between the chained-instruction dispatcher circuit and its instructing entities. In some embodiments an instructions done signal is sent back to an instructing entity as part of bus transactions that is communicated across the bus. In other embodiments, there is a dedicated conductor from the chained-instruction dispatcher circuit across which instructions done signals destined for the particular instructing entity are sent.

In one specific example, the instruction queue circuit 11 and the done bit circuit 38 are clocked. When a go signal for a set of instructions is output from the queue circuit 3, then all entries in the instruction queue circuit 11 that were used to store instructions of the set are flagged as now being available for use in storing other instructions received from the instruction loader. If an occupied queue storage location in the instruction queue circuit 11 is followed (downward in the illustration of FIG. 2) by a queue storage location that is no longer being used, then the contents of the occupied queue storage location is moved downward into the adjacent available queue storage location. The contents of the corresponding bits in the done bit circuit 38 are simultaneously moved. Over time as the circuitry is clocked, the bottom queue storage locations are occupied with instructions. The uppermost queue storage location, on the other hand, is available for receiving an incoming instruction from the instruction loader. Pending instructions and their corresponding done bit values are pushed down in the queue to pack them, without intervening unoccupied queue storage locations, at the bottom of the instruction queue and done bit circuitry. In this sense the queue circuit is said to be "self-packing", and all instructions are "pushed" into the same one receiving queue storage location of the queue circuit.

An embodiment of the chained-instruction dispatcher circuit may be made available by one company as a predesigned block of circuitry that is then incorporated into another company's integrated circuit design as a general purpose block. Such a predesigned block of IP is sometimes referred to in the art as a block of "IP". Communication between instructing entities and the predesigned block of IP may be via a standard bus. Similarly, communication between the processing engines and the predesigned block may be via a standard bus. A hardware designer who incorporates the predesigned block of IP into a larger integrated circuit design need not understand or be aware of the internal structure and operation of the pre-designed block, but rather interfaces to the pre-designed block in accordance with an interface description supplied by the original designer of the predesigned block.

Specific Example in a Network Device

Figure 3:
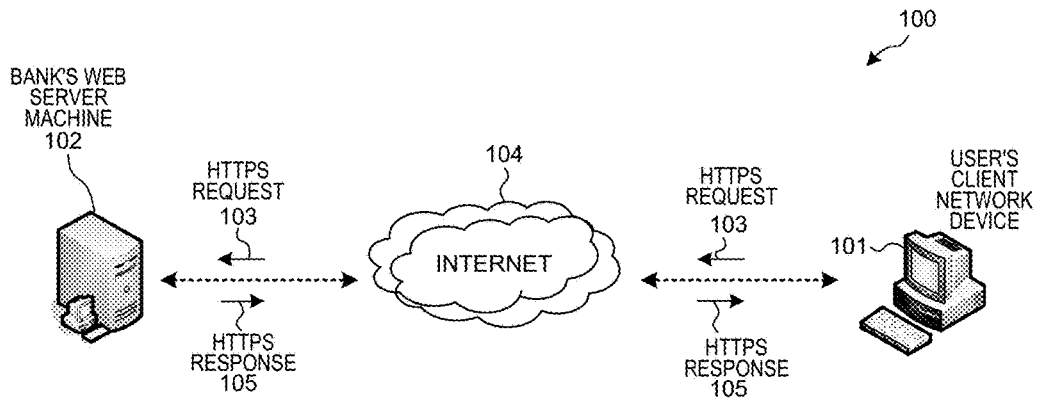
FIG. 3 is a diagram of a system 100 in which the chained-instruction dispatcher circuit 1 of FIG. 1 in used in one example.

FIGS. 3-21 set forth an operational example of the chained-instruction dispatcher circuit 1 of FIG. 1 in use in a system 100. As shown in FIG. 3, the particular system illustrated involves a user's client network device 101 and a bank's server machine 102. The chained-instruction dispatcher circuit 1 is a part of the bank's server machine 102. As explained in further detail below, a bank customer uses client network device 101 to send an HTTPS request 103 for sensitive bank information through the internet 103 to the server 102. The server 102 in turn responds by sending back the encrypted information as part of an HTTPS response 105.

Figure 4:
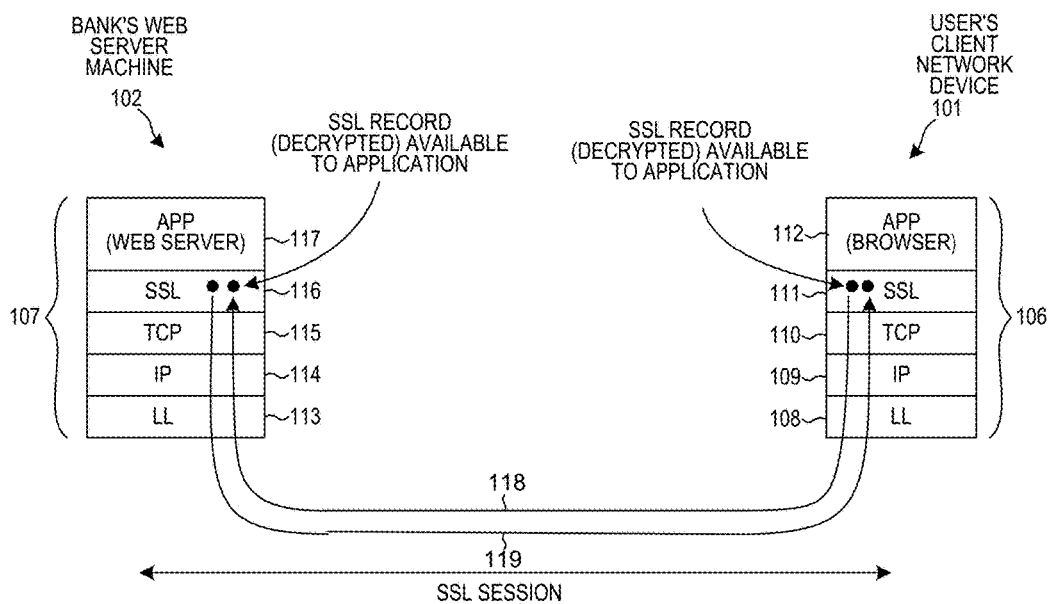
FIG. 4 is a diagram of that illustrates the stacks operating in the bank's server and in the client's network device in the system 100 of FIG. 3.

FIG. 4 is a diagram of that illustrates the protocol processing stack 106 on client network device 101 and the protocol processing stack 107 on the bank's server 102. The stack 106 includes protocol processing layers 108-112. The stack 107 includes protocol processing layers 113, 114, 115, 116, 116A and 117. After a TCP connection is setup between the client's network device 101 and the bank's server 102, SSL parameters are negotiated and an SSL session is set up. Arrows 118 and 119 represent encrypted SSL records that are communicated back and forth between the client network device 101 and the server 102. The TCP connection is established first, and then information to set up an SSL session is negotiated in an SSL handshake.

Figure 5:
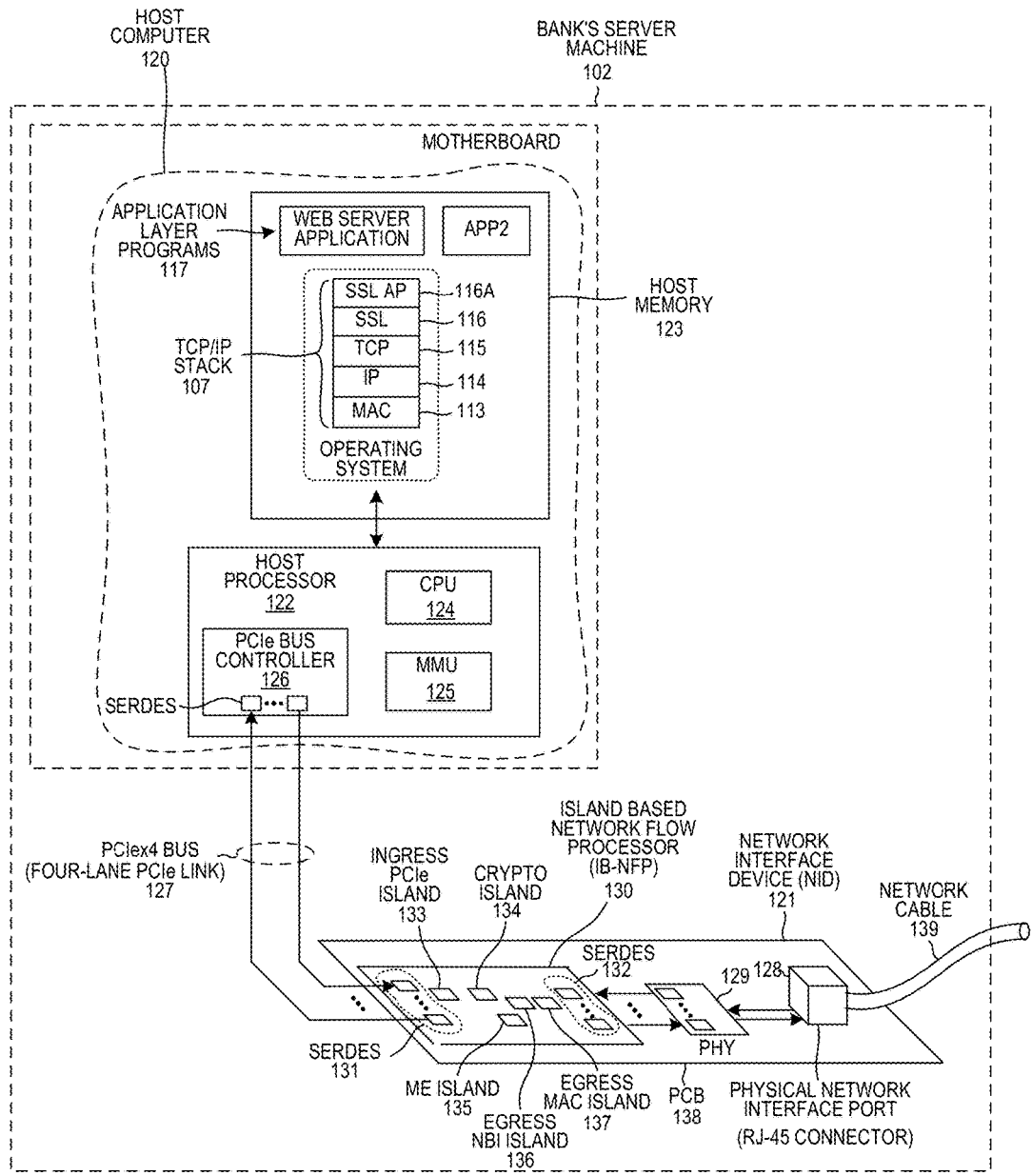
FIG. 5 is a more detailed diagram of the bank's server machine 102 in the system of FIG. 3.

FIG. 5 is a more detailed diagram of the bank's server machine 102. Server machine 102 includes a host computer portion 120 and a Network Interface Device (NID) portion 121. In this example, the NID is a Network Interface expansion Card (NIC) that plugs into a connector of the host computer 120. The programs executed by the host processor 122 are shown residing in host memory 123. The host processor 122 includes, among other parts, a CPU 124, a MMU 125 and a PCIe bus controller 126. For additional information on the PCIe circuitry of the IB-NFP, see: U.S. patent application Ser. No. 14/172,844, entitled "Network Interface Device That Maps Host Bus Writes Of Configuration Information For Virtual NIDs Into A Small Transactional Memory", filed on Feb. 4, 2014, by Gavin J. Stark and Rolf Neugebauer (the entire subject matter of which is incorporated herein by reference). The host computer 120 communicates with the NID 121 via the PCIe bus controller 126 across a PCIe bus 127. NID 121 includes, among other parts not shown, a physical network interface port 128, a PHY integrated circuit 129, and an IB-NFP (Island Based Network Flow Processor) integrated circuit 130. IB-NFP 130 includes, among other parts not illustrated, two sets of SerDes 131 and 132, an ingress PCIe island 133, a crypto island 134, a ME (MicroEngine) island 135, an egress NBI island 136, and an egress MAC island 137. The physical network interface port 128, the PHY integrated circuit 129 and the IB-NFP integrated circuit 130 are disposed on a printed circuit board 138. Network communications coming into the server 102 from the client network device 101 come in via network cable 139, pass through the physical network interface port 128, pass through the PHY integrated circuit 129, through the IB-NFP 130, across the PCIe bus 127, into the host computer 120, and are processed up the protocol processing stack 107. Network communications passing out of the server 102 to the client network device 101 pass down the stack 107, out of the host computer 120, across the PCIe bus 107 to NID 121, through the IB-NFP 130, through the PHY integrated circuit 129, through physical network interface port 128, and to network cable 139.

Figure 6:
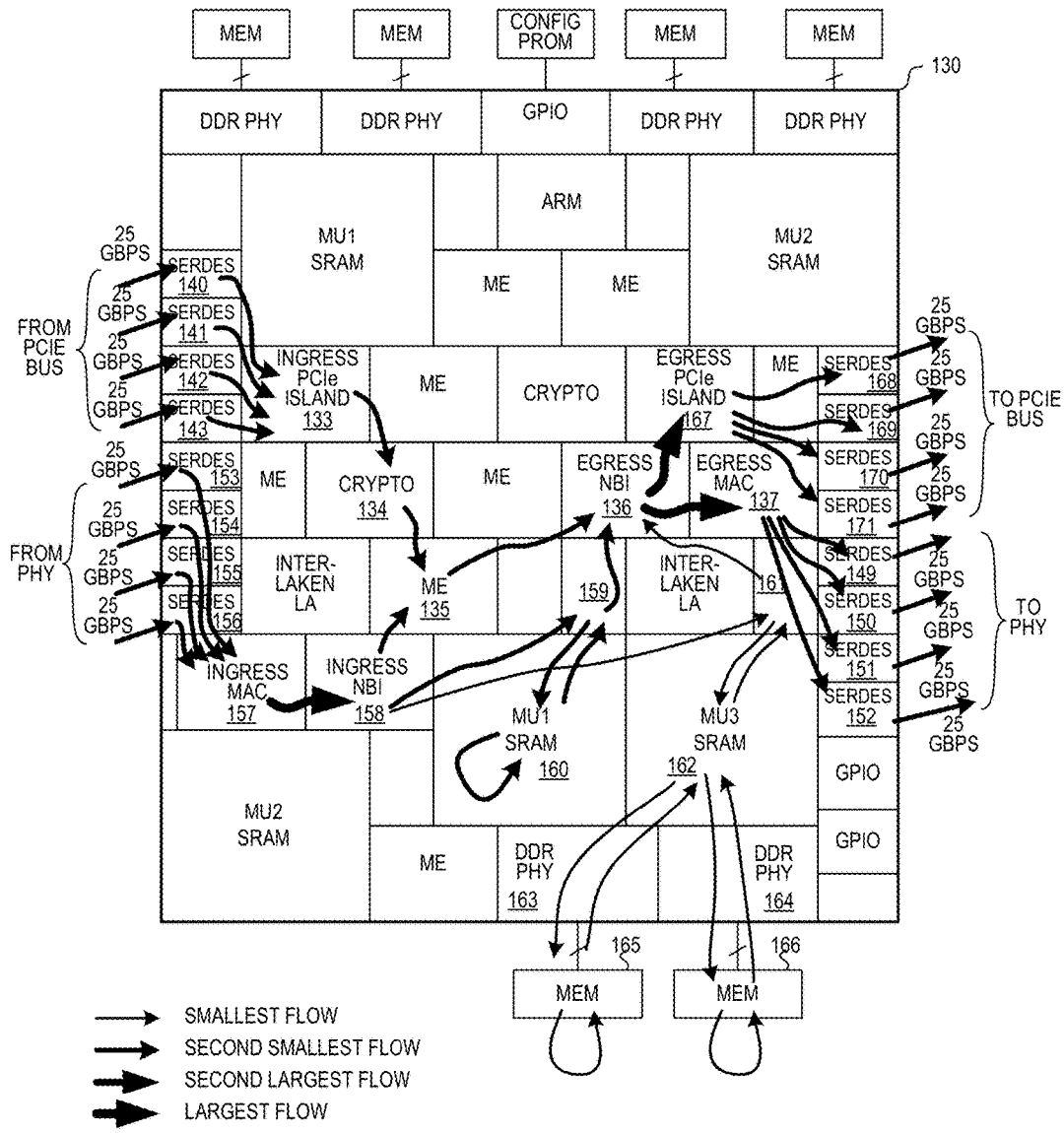
FIG. 6 is a simplified top-down diagram of the IB-NFP integrated circuit 130 of FIG. 5.

FIG. 6 is a simplified top-down diagram of the IB-NFP integrated circuit 130 of FIG. 5. Data flow through the IB-NFP is illustrated in very simplified form by arrows of different thicknesses. For communication from the server 102 to the client network device 101, general information flow passes from the host computer 120, across the PCIe bus 127, into the IB-NFP 130 through duplex SerDes circuits 140-143, through ingress PCIe island 133, through crypto island 134, through ME island 135, through egress NBI island 136, through egress MAC island 137, through duplex SerDes circuits 149-152 and out of the IB-NFP, through PHY integrated circuit 129, and through physical network interface port 128, and to the network cable 139. For communication from the client network device 101 to server 102, general information flow passes from the network cable 139, through physical network interface port 128, through PHY integrated circuit 129, into the IB-NFP 130 through SerDes 153-156, through ingress MAC island 157, and through ingress NBI island 158. Payload data is generally stored in memory islands, memory blocks and external memory circuits 159-166, whereas header information passes to ME island 135. Header information passes from ME island 135 to egress NBI island 136, and data payloads pass from the memory functionality 159-166 to the egress NBI island 136. The flow of information then passes from egress NBI island 136, through egress PCIe island 167, through duplex SerDes 168-171 and out of the IB-NFP 130, across PCIe bus 127, and to the host computer 120. For additional information on the IB-NFP integrated circuit 130 of FIG. 6 and for additional information and how network information flows through and is processed by the various islands of the IB-NFP integrated circuit 130, see: U.S. patent application Ser. No. 13/399,324, entitled "Configurable Mesh Data Bus In An Island-Based Network Flow Processor", filed Feb. 17, 2012, by Gavin J. Stark (the entire subject matter of which is incorporated herein by reference).

Figure 7:
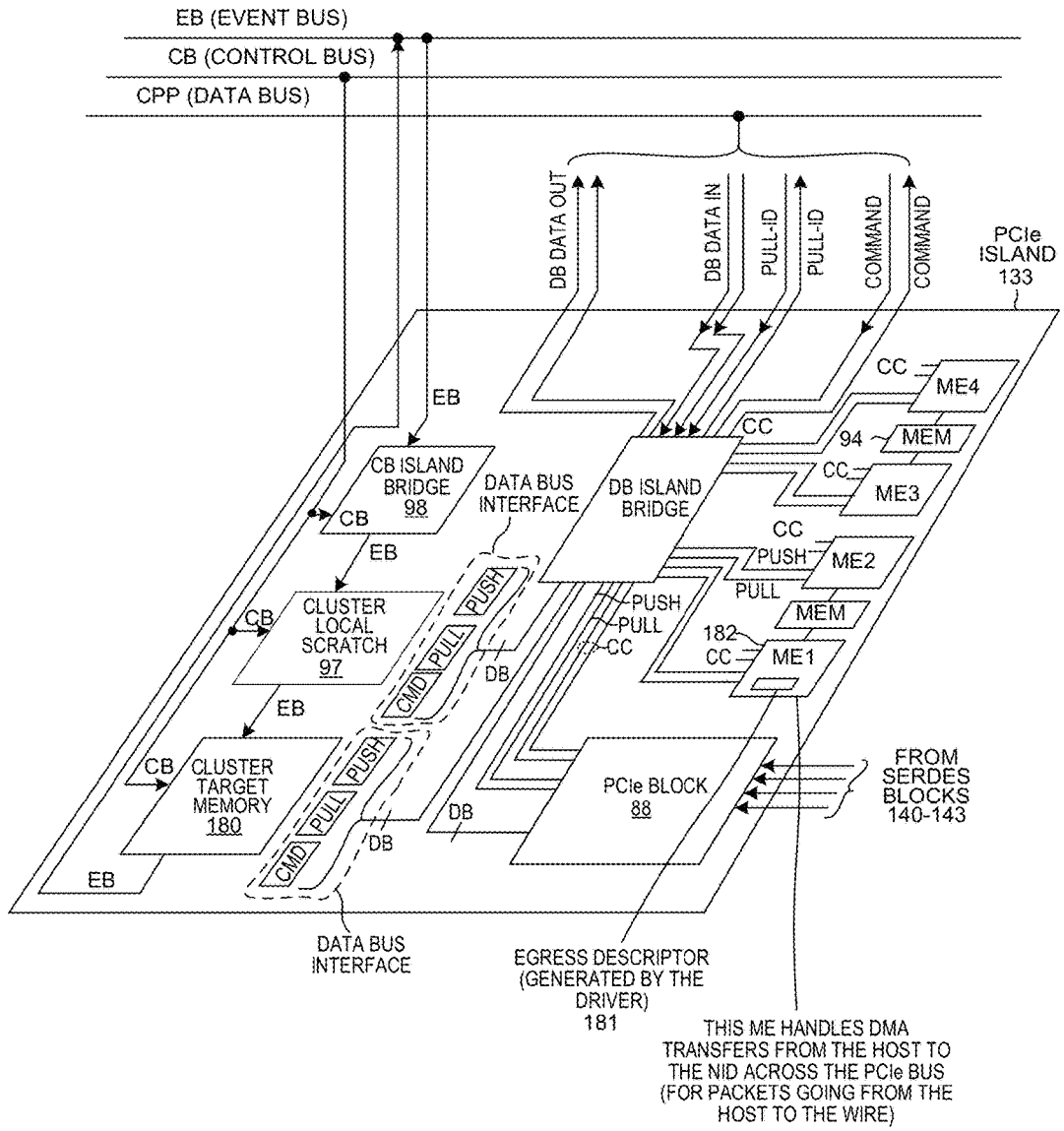
FIG. 7 is a more detailed diagram of the ingress PCIe island 133.

FIG. 7 is a more detailed diagram of the ingress PCIe island 133.

Figure 8:
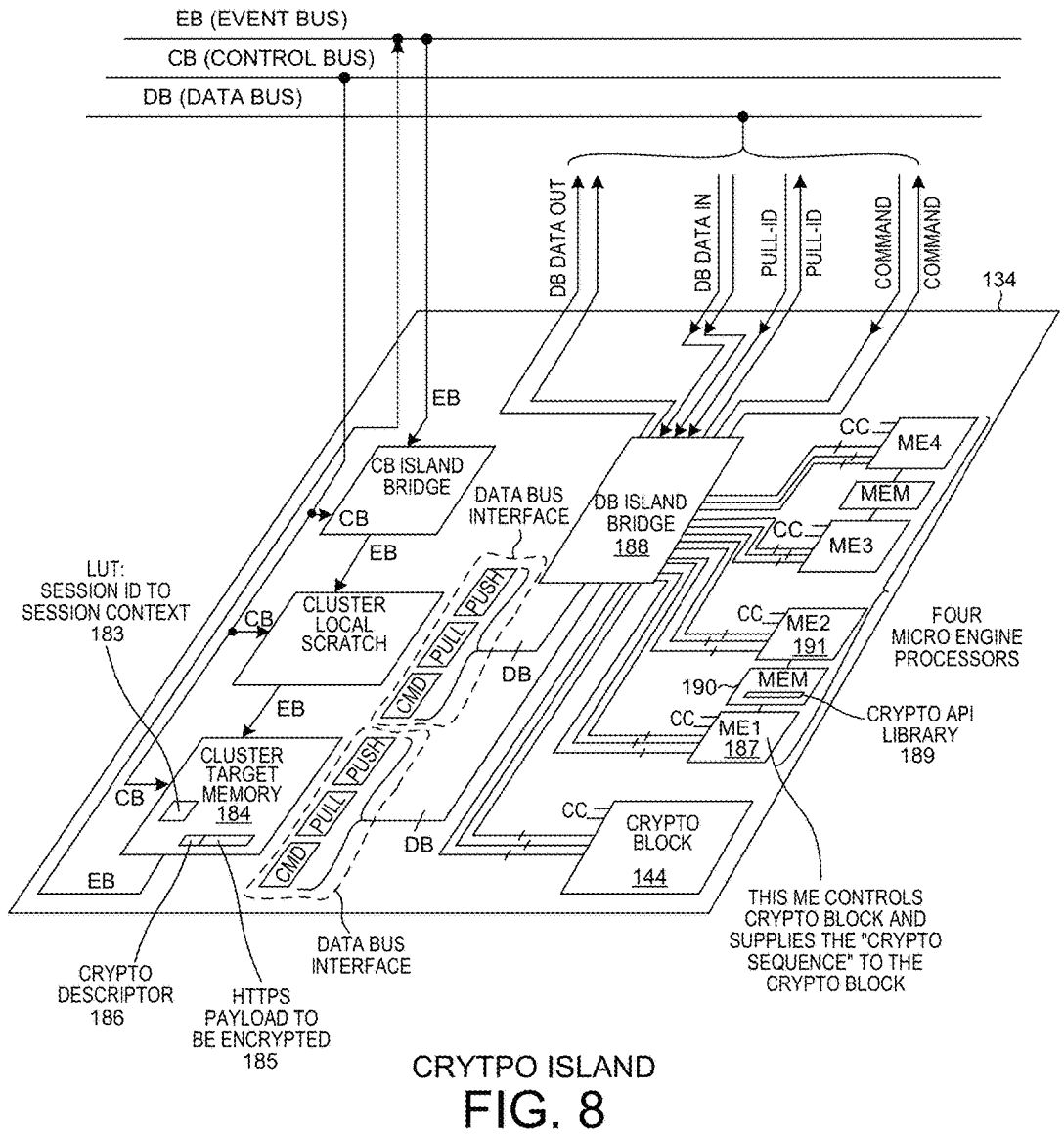
FIG. 8 is a more detailed diagram of the crypto island 134.

FIG. 8 is a more detailed diagram of the crypto island 134.

Figure 9:
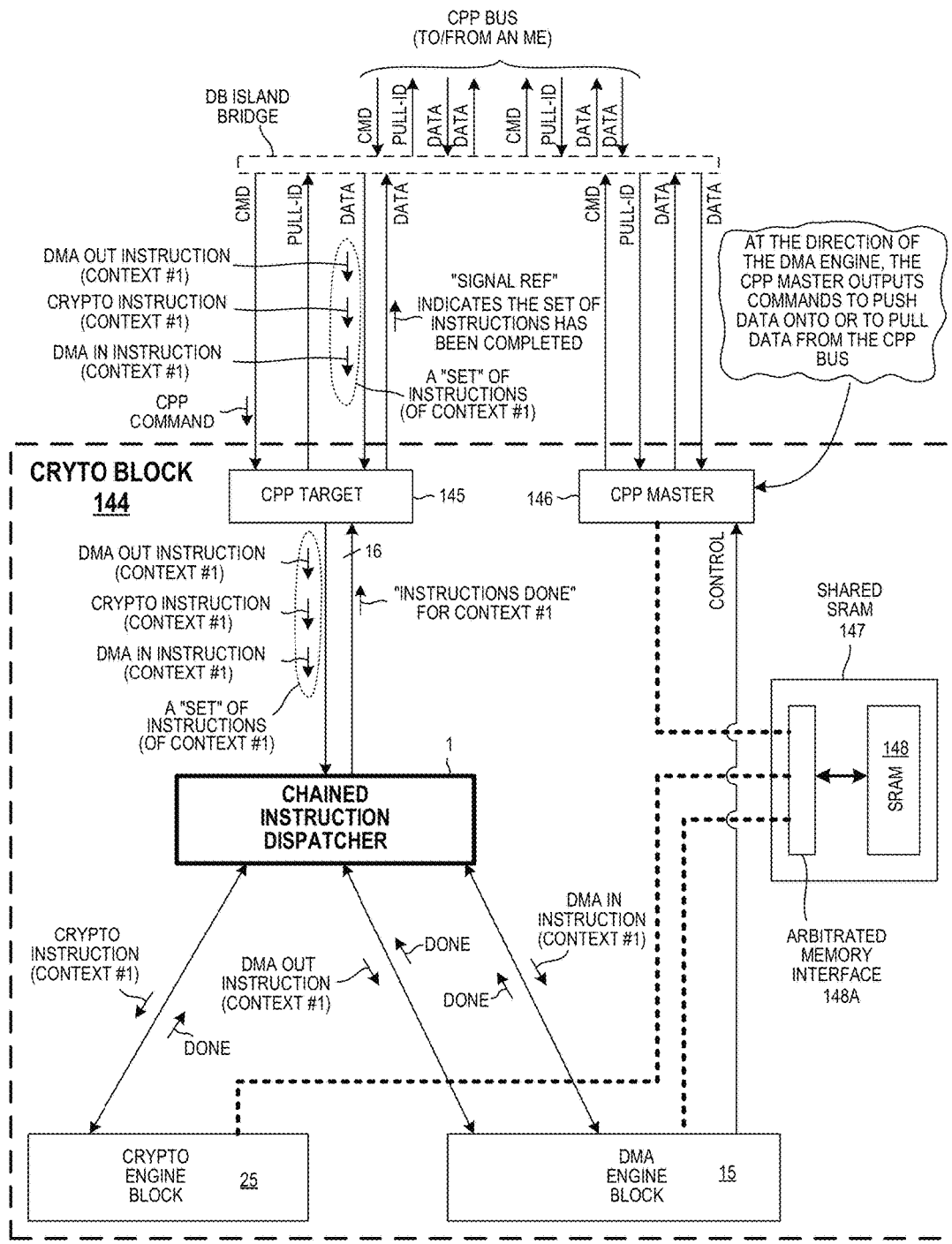
FIG. 9 is a diagram of the crypto block 144 in the crypto island 134 of FIG. 8.

FIG. 9 is a diagram of the crypto block 144 in the crypto island 145 of FIG. 8. Crypto block 144 includes a CPP target 145, a CPP master 146, the chained-instruction dispatcher circuit 1, the crypto engine block 25, the DMA engine block 15, and a shared memory block 147. Shared memory block 147 includes an SRAM portion 148 and an arbitrated memory interface 148A. In accordance with one type of DMA instruction, the DMA engine block 15 interacts with the shared memory 147 and the CPP master 146 so that data in the SRAM 148 of shared memory block 147 will be transferred to the CPP master 146 and so that the CPP master 146 will then push the data across the CPP bus. In accordance with another type of DMA instruction, the DMA engine block 15 causes the CPP master 146 to pull data from the CPP bus so that the data is then placed into the SRAM 148 of the shared memory block 147.

Figure 10:
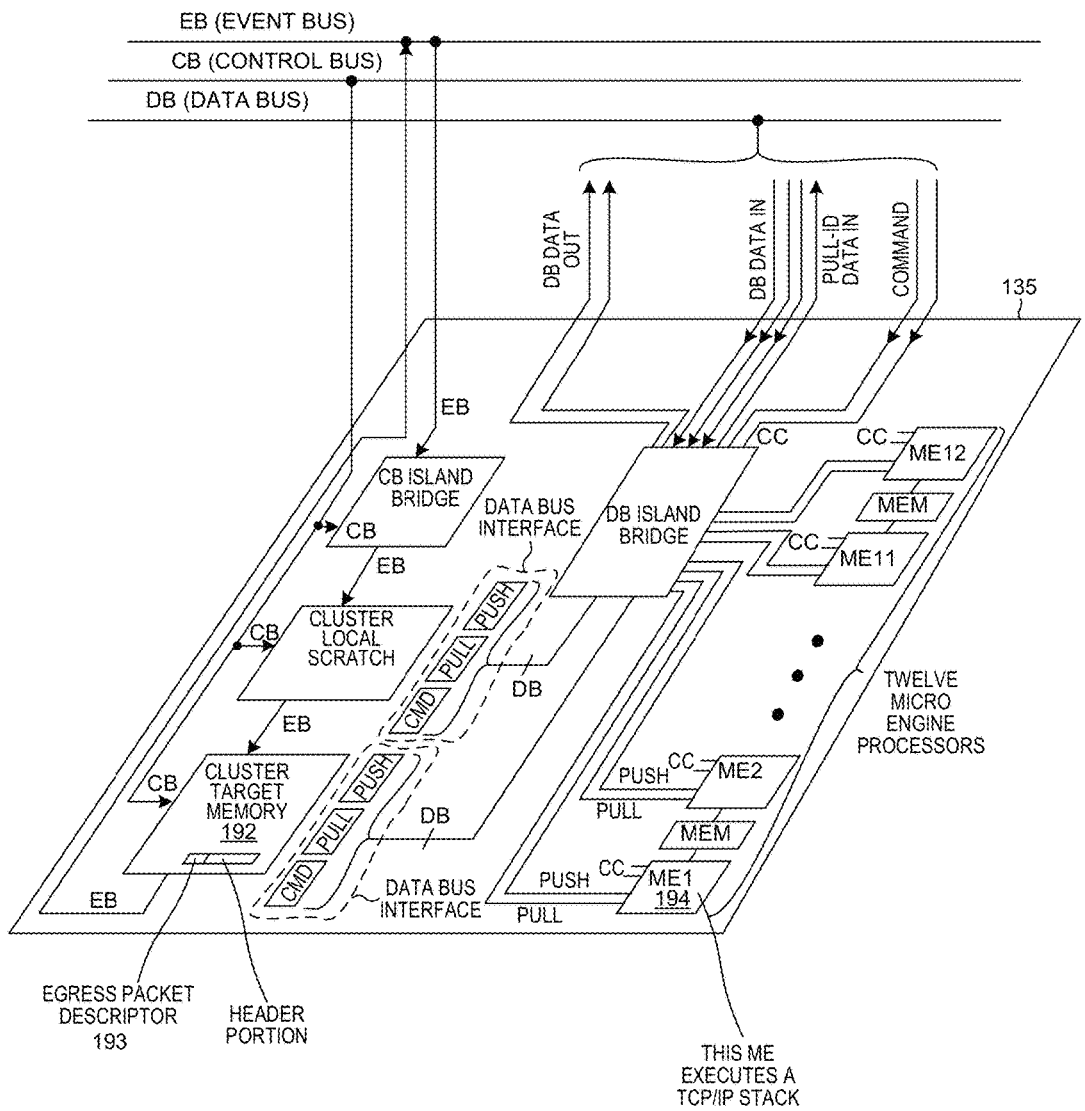
FIG. 10 is a more detailed diagram of the ME island 135.

FIG. 10 is a more detailed diagram of the ME island 135.

Figure 11:
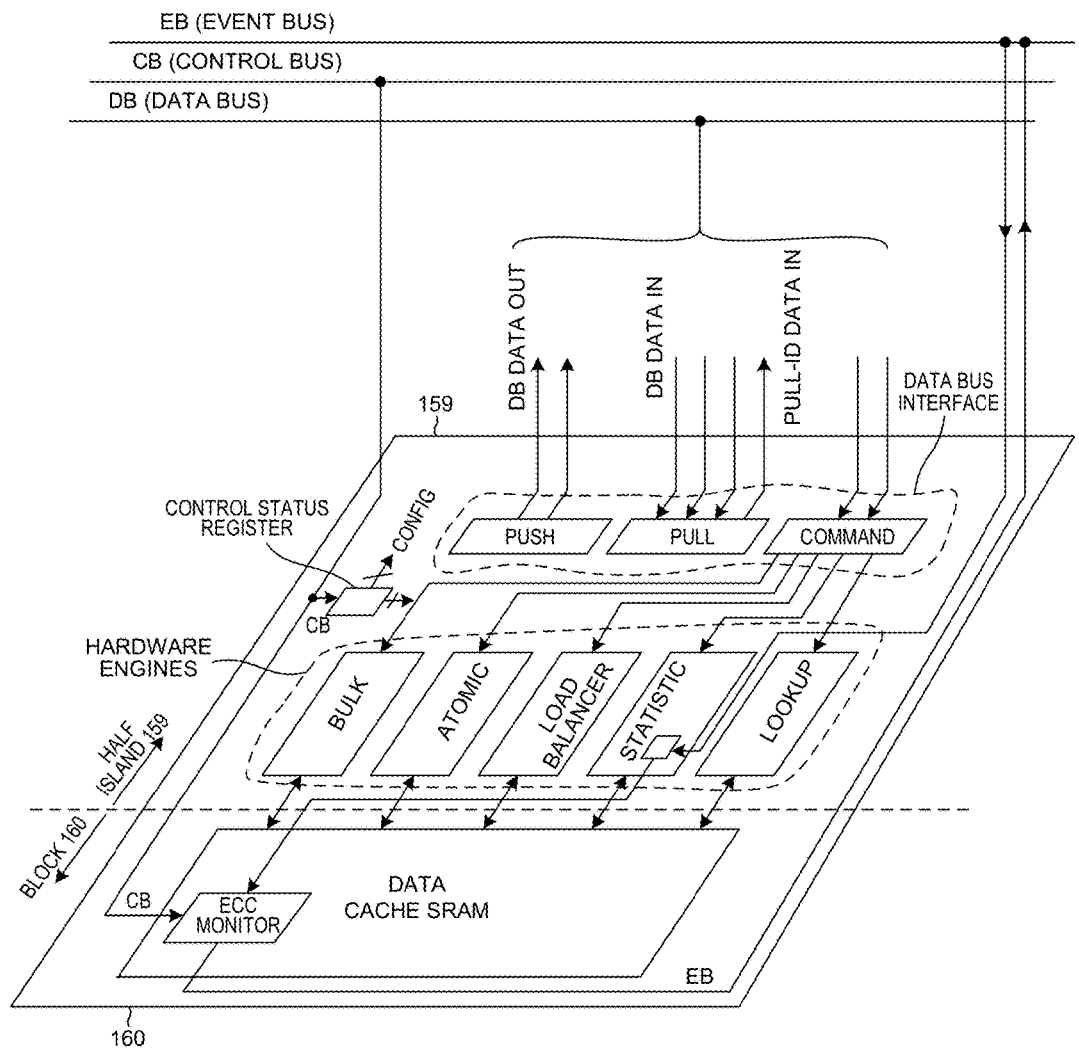
FIG. 11 is a more detailed diagram of the MU half island and block 159 and 160.

FIG. 11 is a more detailed diagram of the MU half island and block 159 and 160.

Figure 12:
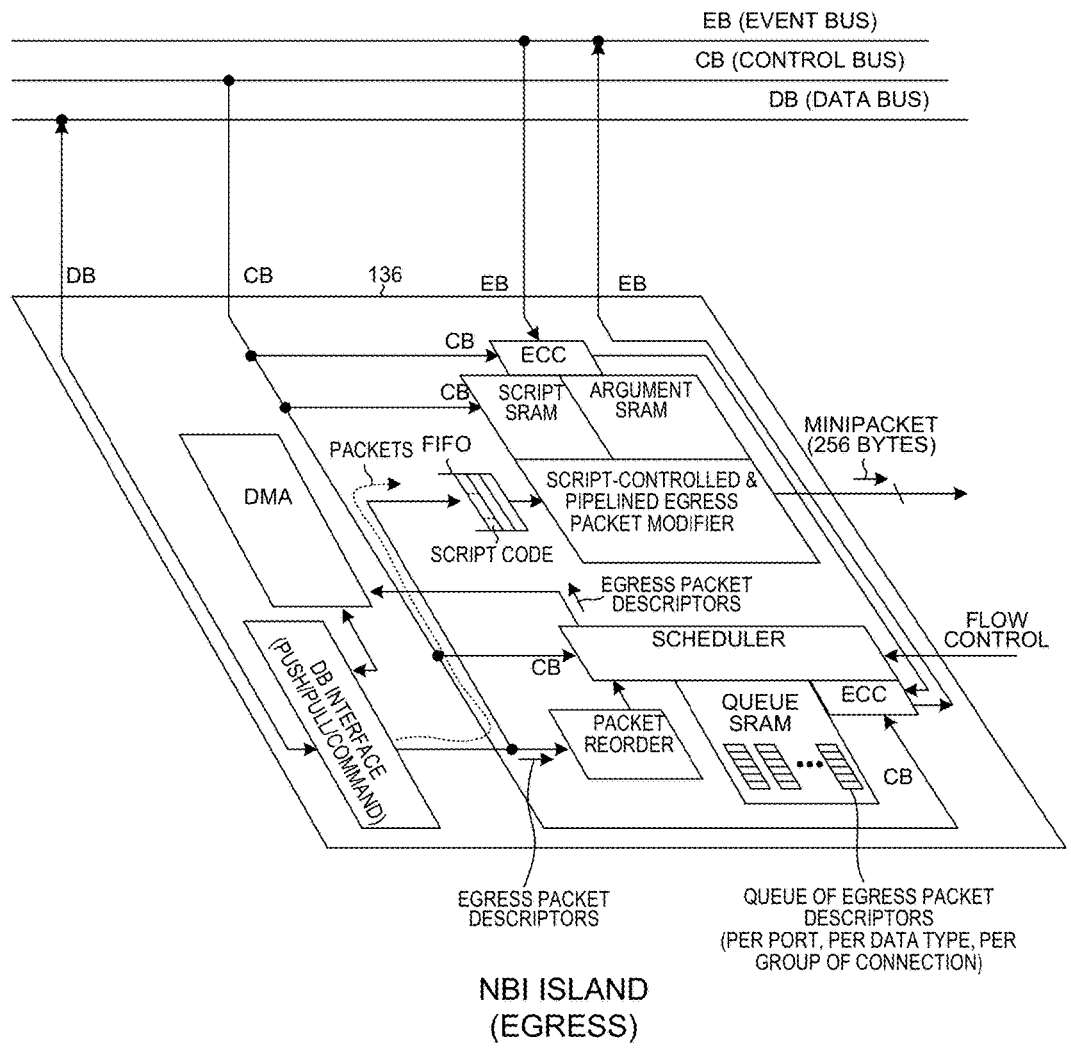
FIG. 12 is a more detailed diagram of the egress NBI island 136.

FIG. 12 is a more detailed diagram of the egress NBI island 136.

Figure 13:
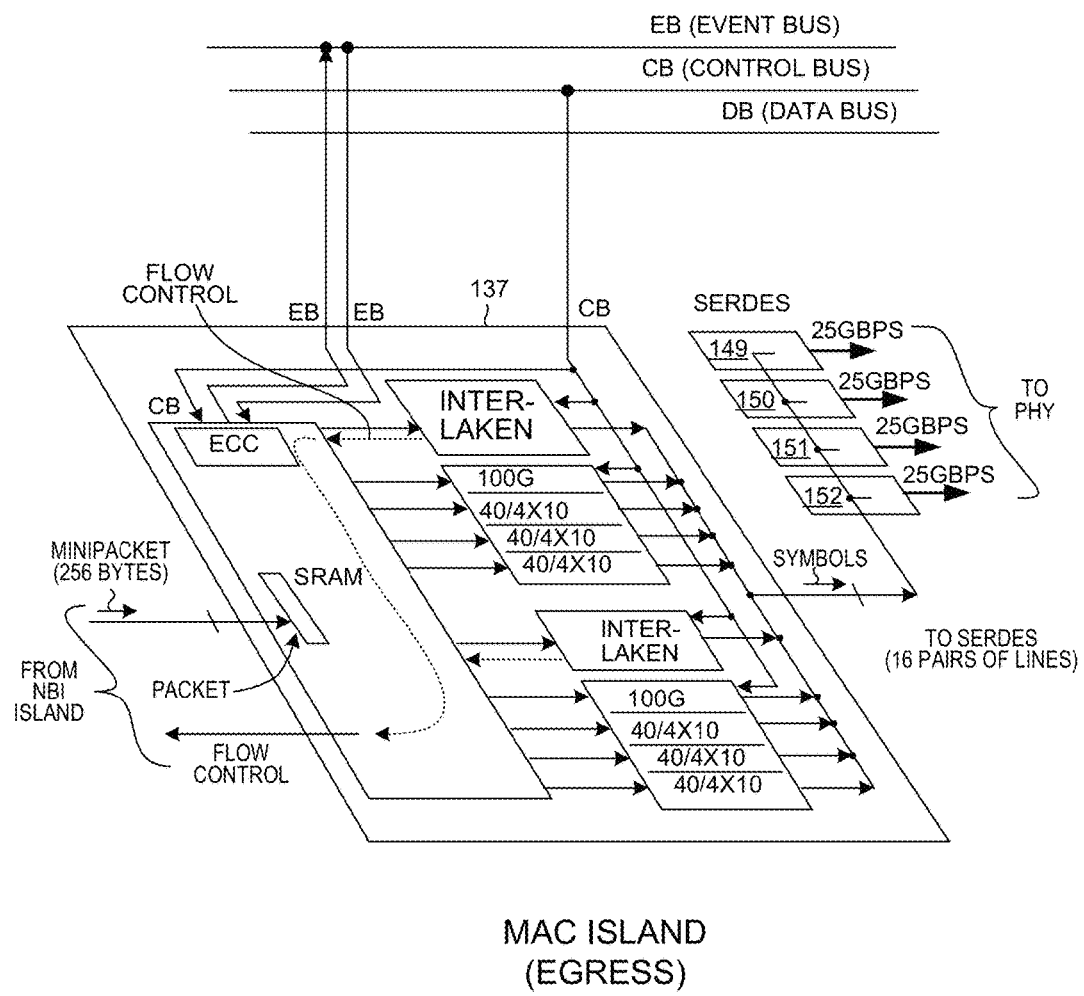
FIG. 13 is a more detailed diagram of the egress MAC island 137.

FIG. 13 is a more detailed diagram of the egress MAC island 137.

Figure 14:
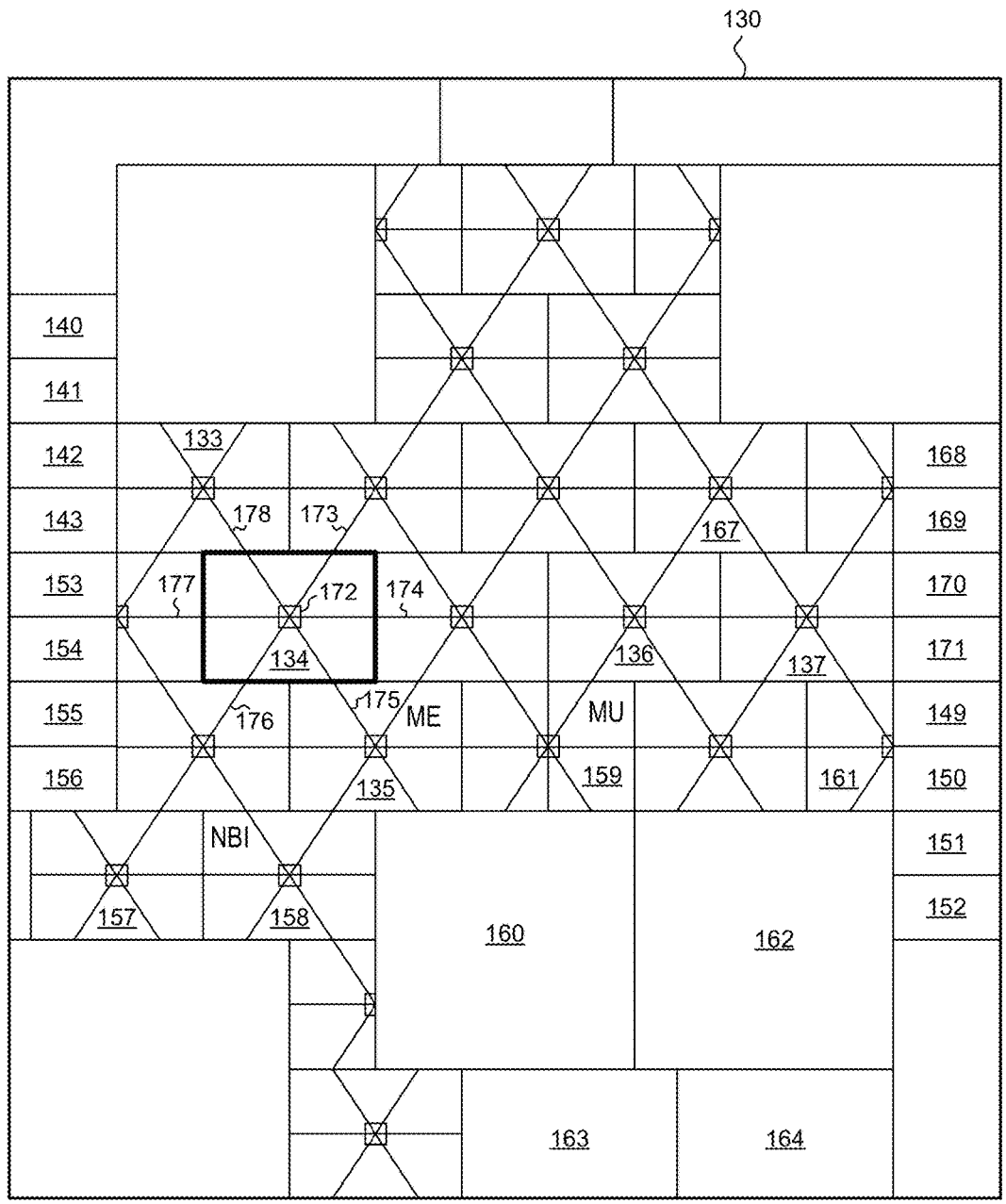
FIG. 14 is a diagram that shows a Command/Push/Push data bus structure that covers the islands of IB-NFP 130.
Figure 21A:
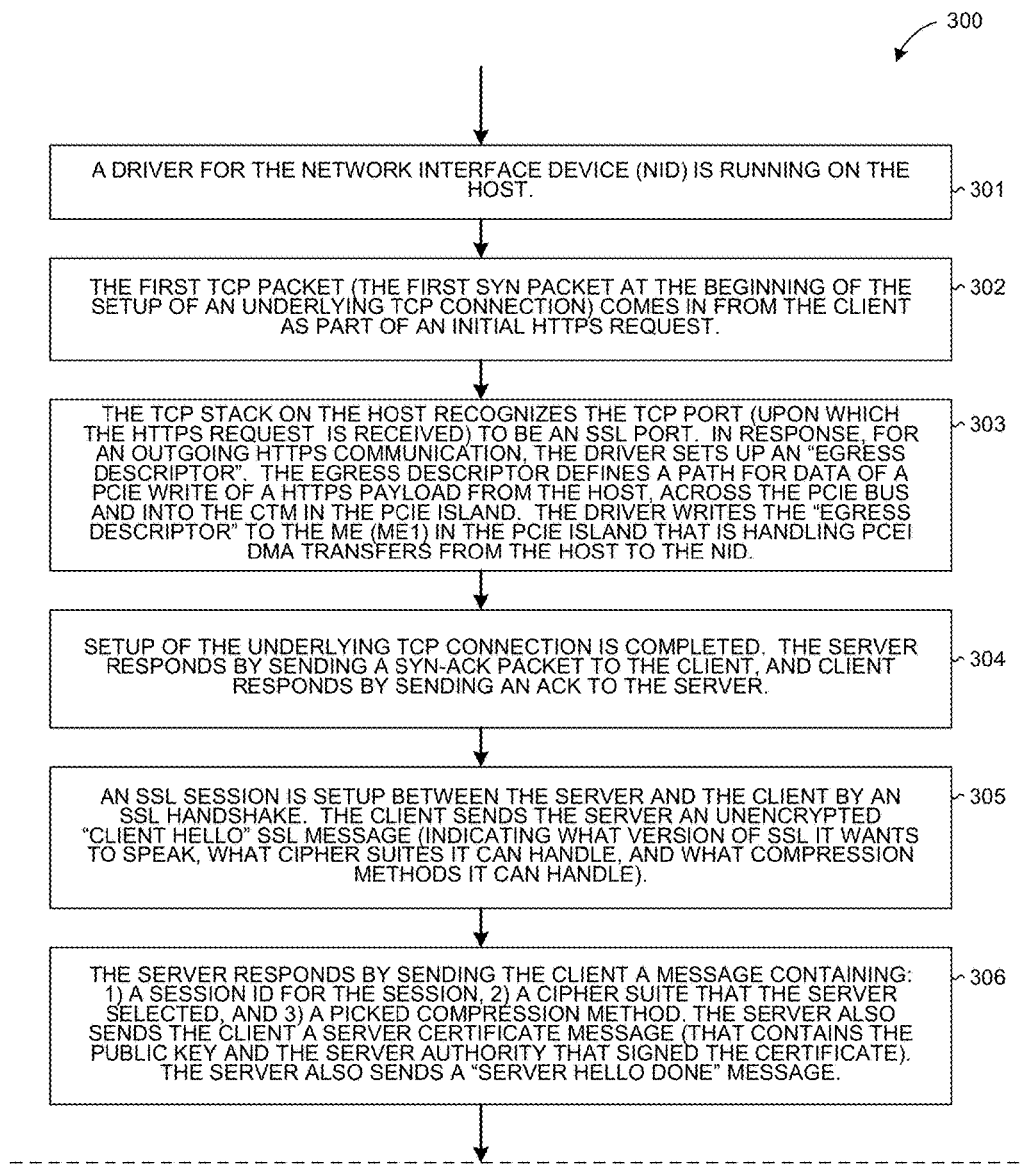
FIG. 21A is a first page of a flowchart of a method 300 involving the chained-instruction dispatcher 1 of FIG. 1 in use in the system 100 of FIG. 3.
Figure 21B:
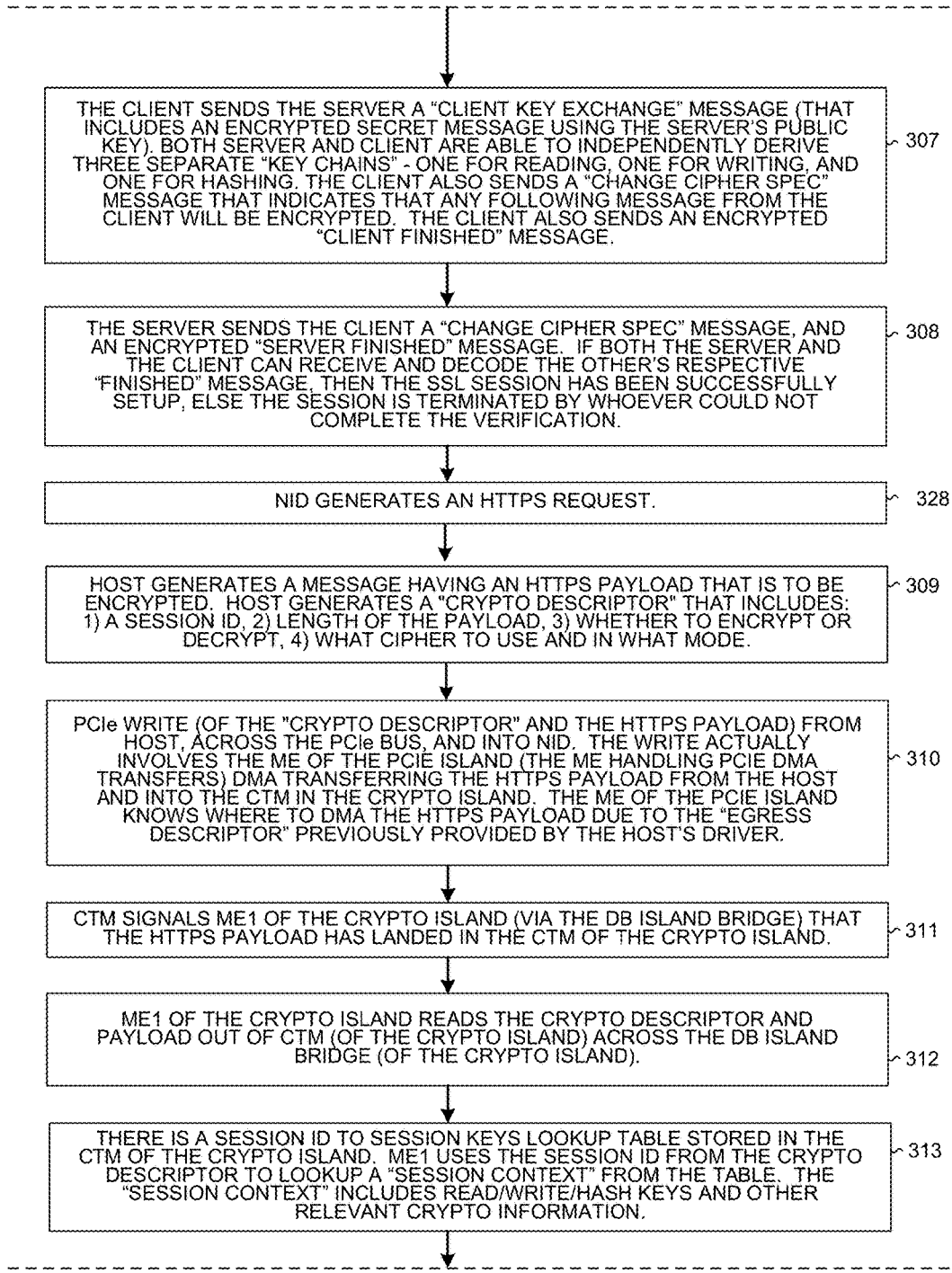
FIG. 21B is a second page of the flowchart of the method 300.
Figure 21C:
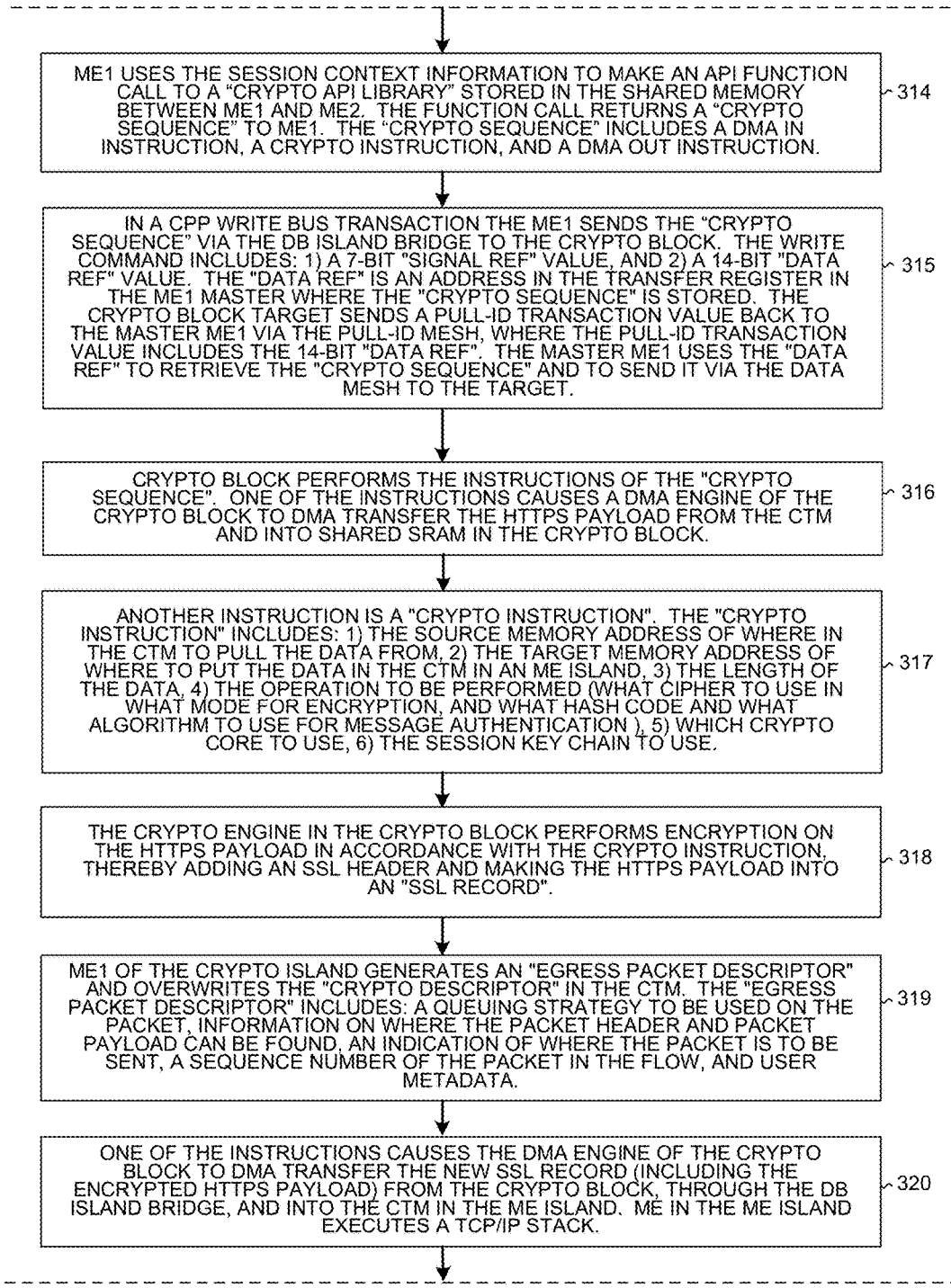
FIG. 21C is a third page of the flowchart of a method 300.
Figure 21D:
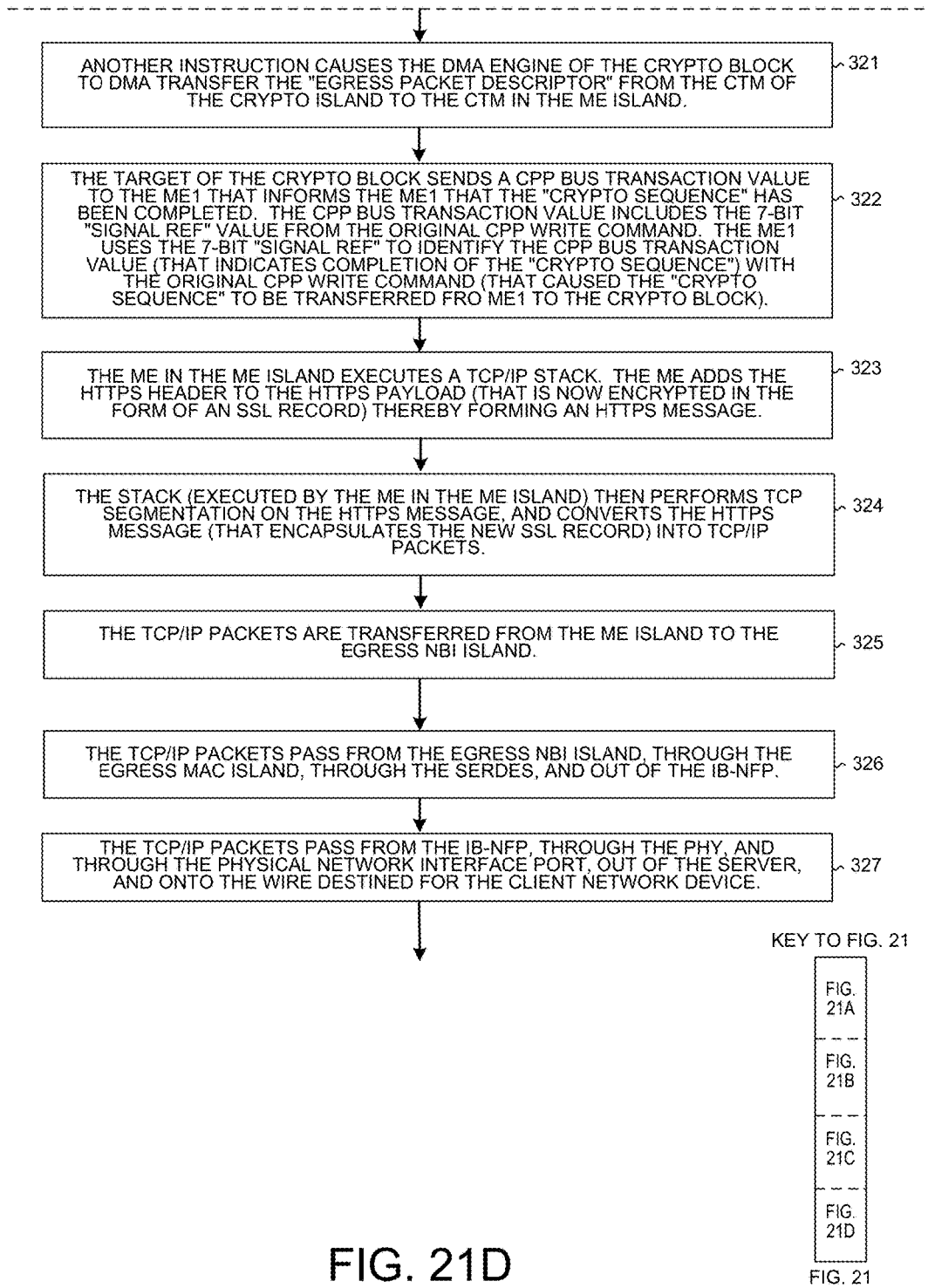
FIG. 21D is a fourth page of the flowchart of the method 300. Together FIGS. 21A-21D form one flowchart.

FIG. 14 is a diagram that shows a Command/Push/Push data bus structure that covers the islands of IB-NFP 130 as a mesh structure. The functional circuitry of the integrated circuit is partitioned into islands. The functional circuitry of an island is coupled by links to a crossbar switch that is located in the center of the island. For example, crossbar switch 172 is the crossbar switch of crypto island 134. Links 173-178 radiate from crossbar switch 172 and extend to the crossbar switches of the neighboring islands as shown. These crossbar switches and links form what is referred to here as a mesh. The CPP data bus structure actually involves four such mesh structures: 1) a command mesh, 2) a pull-id mesh, 3) a first data mesh, and 4) a second data mesh. In accordance with a CPP bus protocol, functional circuitry in one island can communicate with functional circuitry in another island through these meshes. For additional information on the CPP data bus, its structure, and its operation, see: U.S. patent application Ser. No. 13/399,324, entitled "Configurable Mesh Data Bus In An Island-Based Network Flow Processor", filed Feb. 17, 2012, by Gavin J. Stark (the entire subject matter of which is incorporated herein by reference).

CPP Bus Write Transaction: One type of CPP bus transaction is a write. A CPP bus master located in one island writes data into a CPP bus target located in another island. Initially, a write command is said to be "posted" by the master onto the command mesh. As indicated in FIG. 15, the write command includes a metadata portion and a payload portion. The form of the payload portion is as set forth in FIG. 16. The metadata portion includes the 6-bit final destination value. This final destination value identifies an island by number, where the island identified is the final destination of the bus transaction value. The final destination value is used by the various crossbar switches of the command mesh to route the bus transaction value (i.e., the command) from the master to the appropriate target. All bus transaction values on the data bus that originate from the same island that have the same final destination value will traverse through the configurable mesh data bus along the same one path all the way to the indicated final destination island. A final destination island may have more than one potential target. The 4-bit target field of payload portion indicates which one of these targets in the destination island it is that is the target of the command. The 5-bit action field of the payload portion indicates that the command is a write. The 14-bit data reference field is a reference usable by the master to determine where in the master the data is to be found. The address field indicates an address in the target where the data is to be written. The length field indicates the amount of data. Next, the target receives the write command from the command mesh and examines the payload portion of the write command. From the action field the target determines that it is to perform a write action. To carry out this action, the target outputs (i.e., posts) a bus transaction value called a pull-id onto the pull-id mesh. The pull-id is also of the format indicated in FIG. 15, except that the payload portion of the pull-id is of the format set forth in FIG. 17. The final destination field of the metadata portion of the pull-id indicates the island where the master is located. The target port field identifies which sub-circuit target it is within the target's island that is the target of the command. The pull-id is communicated through the pull-id mesh back to the master. The master receives the pull-id from the pull-id mesh and uses the content of the data reference field of the pull-id to find the data. In the overall CPP bus write operation, the master knows the data it is trying to write into the target. The data reference value that is returned with the pull-id is used by the master as a flag to match the returning pull-id with the write operation the master had previously initiated. The master circuit responds by sending the identified data to the target across one of the data meshes data0 or data1 as a "pull" data bus transaction value. The term "pull" means that the data of the operation passes from the master to the target. The term "push" means that the data of the operation passes from the target to the master. The format of the "pull" data bus transaction value sent in this sending of data is also as indicated in FIG. 15, but the format of the payload portion in the case of the payload being pull data is as set forth in FIGS. 18 and 19. The first bit of the payload portion is asserted. This bit being a digital high indicates that the transaction is a data pull as opposed to a data push. The target then receives the data pull bus transaction value across the data1 or data0 mesh. The target writes the content of the data field (the data field of FIG. 19) of the pull data payload portion into target memory at the appropriate location indicated by the address field of the original write command.

CPP Bus Read Transaction: Another type of CPP bus transaction is a read. A CPP bus master located in one island reads data from a CPP bus target located in another island. In a first step, the master uses its data bus interface to output (to "post") a bus transaction value onto the command mesh bus of the configurable mesh CPP data bus. In this case, the bus transaction value is a read command to read data from a target. The format of the read command is as set forth in FIGS. 15 and 16. The read command includes a metadata portion and a payload portion. The metadata portion includes the 6-bit final destination value that indicates the island where the target is located. The action field of the payload portion of the read command indicates that the command is a read. The 14-bit data reference field is usable by the master circuit as a flag to associated returned data with the original read operation the master circuit previously initiated. The address field in the payload portion indicates an address in the target where the data is to be obtained. The length field indicates the amount of data. The target receives the read command and examines the payload portion of the command. From the action field of the payload portion the target determines that it is to perform a read action. To carry out this read action, the target uses the address field and the length field to obtain the data requested. The target then pushes the obtained data back to the master across data mesh data1 or data0. To push the data, the target outputs a push bus transaction value onto the data1 or data0 mesh. FIG. 20 sets forth the format of the payload portion of this push bus transaction value. The first bit of the payload portion indicates that the bus transaction value is for a data push, as opposed to a data pull. The master receives the bus transaction value of the data push from the data mesh bus. The master then uses the data reference field of the push bus transaction value to associate the incoming data with the original read command, and from the original read command determines where the pushed data (data in the data field of the push bus transaction value) should be written into the master. The master then writes the content of the data field of the data field into the master's memory at the appropriate location.

FIG. 21 is a flowchart of a method 300 involving the chained-instruction dispatcher 1 in use in the system 100 of FIG. 3. Initially, a driver for the NID 121 is running (step 301) on the host computer 120 of server 102. The driver is the SSL AP layer 116A, which in this example is an SSL NIC. The first TCP packet of a TCP connection setup handshake is received onto (step 302) the NID 121 from the user's client network device 101 ("client") as part of an initial HTTPS request. This first TCP packet is the first SYN packet of a three-way SYN, SYN-ACK, ACK connection setup handshake. The driver recognizes (step 303) the TCP port upon which the HTTPS request is received to be an SSL port. In response, the driver sets up an "egress descriptor" for an outgoing HTTPS communication to be sent back to the client. The egress descriptor defines a path for data of a PCIe write of a HTTPS payload from the host computer, across the PCIe bus, and into the CTM (Cluster Target Memory) 180 of the PCIe island 133 of the IB-NFP of the NID 121. The driver writes this "egress descriptor" 181 to the ME 182 (MicroEngine) in the PCIe island 133 that is handling PCIe DMA transfers from the host to the NID.

The server responds to the SYN packet by returning a SYN-ACK packet back to the client. The client in turn responds by sending the server an ACK. Accordingly, setup of the underlying TPC connection is completed (step 304).

After the underlying TCP connection has been setup using this three-way handshake, then an SSL session is setup (step 305) via a full RSA handshake. The SSL session is between the server 102 and the client 101. The client 101 sends the server 102 an unencrypted "Client Hello" SSL message. The Client Hello message indicates: 1) what version of SSL the client can use, 2) what cipher suites the client can handle, and 3) what compression methods the client can handle. The server responds (step 306) by sending the client a message containing: 1) a session ID for the session, 2) a cipher suite that the server selected, and 3) a compression method selected by the server. The server also sends the client a server certificate message (that contains the public key and an indication of the server authority that signed the certificate). The server also sends the client a "Server Hello Done" message. The client responds (step 307) by sending the server a "Client Key Exchange" message that includes an encrypted secret message that was encrypted using the server's public key. At this point, both the server and the client are able to independently derive three separate "key chains": 1) one key chain is for reading, 2) one key chain is for writing, and 3) one key chain is for hashing. The client also sends the server a "Change Cipher Spec" message that indicates that any following message from the client will be encrypted. There is a "session ID" to "session context" lookup table 183 stored in the CTM 184 of the crypto island 134. The "session context" includes: 1) session key chains, 2) session parameters including an API call that can be made. After the session key chains are determined in the SSL session setup, the key chains are installed in this "session ID" to "session context" lookup table 183. The client also sends an encrypted "Client Finished" message. The server responds (step 308) by sending the client a "Change Cipher Spec" message, and an encrypted "Server Finished" message. If both the server and the client can receive and decode the other's respective finished message, then the SSL session has been successfully setup.

After the SSL session has been setup, the NID generates an HTTPS request (step 328). The host computer 120 responds with an HTTPS message (step 309) that has an HTTPS payload 185 that is to be encrypted by the NID. The host computer 120 also generates a "crypto descriptor" 186 that includes: 1) a session ID, 2) an indication of the length of the payload, 3) whether to encrypt or decrypt, and 4) an indication of what cipher to use and in what mode. The host computer 120 then performs a PCIe write (step 310) to transfer the "crypto descriptor" 186 and the HTTPS payload 185 (to be encrypted by the NID) from the host computer, across the PCIe bus, and into the NID 121. The PCIe write actually involves the ME 182 of the PCIe island 133 of the NID (the ME that handles PCIe DMA transfers) DMA transferring the HTTPS payload 185 from the host and into the CTM 184 in the crypto island 134. The ME 182 of the PCIe island 133 knows where to DMA the crypto descriptor 186 and HTTPS payload 185 due to the "crypto descriptor" 186 having been previously provided by the host's driver. The CTM 184 in the crypto island 134 then informs ME 187 (step 311) of the crypto island (via the DB island bridge 188) that the HTTPS payload 185 has landed in the CTM 184 of the crypto island. ME 187 of the crypto island reads (step 312) the crypto descriptor 186 and HTTPS payload 185 out of the CTM 184 (the CTM of the crypto island) and across the DB island bridge 188 (of the crypto island), and into ME 187.

ME 187 uses the session ID from the crypto descriptor to lookup (step 313) a "session context" from the "session ID" to "session context" lookup table 183 in the CTM 184 of the crypto island. ME 187 then uses the looked up "session context" to make the indicated API function call (step 314) to a "crypto API library" 189. The "crypto API library" 189 is stored in the shared memory 190 between ME 187 and ME 191. The API function returns a "crypto sequence" to ME 187. In the present example, the "crypto sequence" includes: 1) a DMA in instruction, 2) a crypto instruction, and 3) two DMA out instructions. Next, ME 187 employs a CPP write bus transaction to send (step 315) the "crypto sequence" to the crypto block 144 via the DB island bridge 188 utilizing the CPP protocol. The CPP write command sent across the command mesh includes: 1) a 7-bit "signal ref" value, 2) a 14-bit "data ref" value. The "data ref" is an address in the transfer register in the ME 187 CPP master where the "crypto sequence" is stored. The CPP target 145 in crypto block 144 receives the command, and returns a pull-id transaction value back to the CPP master ME 187 via the pull-id mesh. The pull-id transaction value includes the 14-bit "data ref". The ME CPP master 187 receives the pull-id from the pull-id mesh and uses the "data ref" to retrieve the "crypto sequence" from where it is stored in the master and to send it via the data mesh to the CPP target 145 in the crypto block 144. The crypto block 144 then performs (step 316) the instructions of the "crypto sequence" as described above in connection with FIGS. 1 and 2. All four instructions of the "crypto sequence" are of the same context. The CPP target 145 of the crypto block 144 forwards the instructions of the crypto sequence to the instruction loader. The DMA in instruction is of a type that the instruction loader forwards to the first queue circuit. The crypto instruction is of a type that the instruction loader forwards to the second queue circuit. The DMA out instruction is of a type that the instruction loader forwards to the third queue circuit. The first instruction of the context to be dispatched is the DMA in instruction. The DMA in instruction is dispatched to the DMA engine block 15 by the first queue circuit. The DMA in instruction causes the DMA engine block 15 to transfer the HTTPS payload 185 from the CTM 184 and into shared SRAM 147 in the crypto block 144. When this DMA in instruction has completed, the DMA engine block 15 returns an "instruction done" signal back to the first queue circuit. The first queue circuit responds by supplying a "go signal" for the context to the second queue circuit. In response, the second queue circuit dispatches its crypto instruction (step 317) for the context (which is the crypto instruction in this case) to the crypto engine block 25. The crypto instruction includes: 1) the source memory address of where in the CTM 184 to pull that data from, 2) the target memory address of where to put the data in a CTM 192 in ME island 135, 3) the length of the data, 4) the operation of be performed (what cipher to use in what mode for encryption, and what hash code and what algorithm to use for message authentication), 5) which crypto core to use, and 6) the session key chain to use. The crypto engine block 15 performs encryption on the HTTPS payload in accordance with the crypto instruction (step 318), thereby adding an SSL header and making the HTTPS payload into an "SSL record". ME 187 of the crypto island 134 generates an "egress packet descriptor" 193 (step 319) and overwrites the "crypto descriptor" 186 in the CTM 184 with the "egress packet descriptor" 193. The "egress packet descriptor" 193 includes: an indication of a queuing strategy to be used on the packet, information on where the packet header and packet payload can be found, an indication of where the packet is to be sent, a sequence number of the packet in the flow, user metadata, and other information used in assembling and outputting the packet. When the crypto engine block 25 has completed carrying out the crypto instruction, then the crypto engine block 25 returns an "instruction done" signal back to the second queue circuit. The second queue circuit responds by supplying a "go signal" for the context to the third queue circuit. In response, the third queue circuit dispatches its two DMA out instructions for the context (which are the two DMA out instructions in this case) to the DMA engine block 15. The first DMA out instruction (step 320) causes the DMA engine block 15 to DMA transfer the new SSL record (including the encrypted HTTPS payload) from the crypto block 144, through the DB island bridge 188, and into the CTM 192 in the ME island 135. When the DMA engine block 15 has completed carrying out the first DMA out instruction, the DMA engine block 15 returns an "instruction done" signal back to the third queue circuit. This causes the done bit for the first DMA out instruction to be set. The DMA engine block 15 also carries out the second DMA out instruction. The second DMA instruction (step 321) causes the DMA engine block 15 to DMA transfer the "egress packet descriptor" 193 from the CTM 184 of the crypto island 134 to the CTM 192 in the ME island 135. When the DMA engine block 15 has completed carrying out the second DMA out instruction, the DMA engine block 15 returns an "instruction done" signal back to the third queue circuit. This causes the done bit for the second DMA out instruction to be set. When third queue circuit detects that the done bits for all the DMA out instructions of the context have been set, then third queue circuit returns an "instructions done" signal for the context to the CPP target 145 of the crypto block 144. The CPP target 145 of the crypto block 144 responds by completing the CPP write bus transaction by sending (step 322) a CPP bus transaction value to ME 187 via a data mesh, where the CPP bus transaction value includes the 7-bit "signal ref" value from the original CPP write command. ME 187 uses the 7-bit "signal ref" to identify the original CPP bus transaction, and therefore to determine that the entire "crypto sequence" that was carried by the original CPP write is now indicated as having been completed. ME 194 in the ME island 135 adds the HTTPS header (step 323) to the encrypted HTTPS payload (now encrypted in the form of an SSL record), thereby forming an HTTPS message. The TCP/IP stack (executed by ME 194 in ME island 135) then performs TCP segmentation (step 324) on the HTTPS message, and converts the HTTPS message (that encapsulates the new SSL record) into TPC/IP packets. The TCP/IP packets are transferred (step 325) from the ME island 135 to the egress NBI island 136. The TCP/IP packets pass (step 326) from the egress NBI island 136, through the egress MAC island 137, through the SerDes 149-152, and out of the IB-NFP 130. The TCP/IP packets pass (step 327) from the IIB-NFP 130, through the PHY integrated circuit 129, and through the physical network interface port 128, out of the server 102, and onto the wire 139 destined for the client 101.

Although the present invention has been described in connection with certain specific embodiments for instructional purposes, the present invention is not limited thereto. Although an example of a queue circuit is illustrated and described above that has a self-packing instruction queue circuit such that instructions are pushed into the uppermost queue storage location, in other examples the queue circuit is register-based such that instructions are not moved once they are loaded into the queue circuit but rather new instructions are loaded into registers that are known to be unoccupied where the receiving registers can be located anywhere in the instruction queue circuit. Accordingly, various modifications, adaptations, and combinations of various features of the described embodiments can be practiced without departing from the scope of the invention as set forth in the claims.

What is claimed is:

1. An instruction dispatcher circuit comprising:
an instruction loader that receives from an instructing entity and onto the instruction dispatcher circuit a set of first instructions and that also receives a set of second instructions, wherein the set of first instructions includes one or more first instructions of a first type, one or more first instructions of a second type, and one or more first instructions of a third type, and wherein the set of second instructions includes one or more second instructions of the first type, one or more second instructions of the second type, and one or more second instructions of the third type;
a first queue circuit: 1) that receives and stores instructions of the first type from the instruction loader, 2) that dispatches instructions of the first type to one or more processing engines, 3) that for each dispatched instruction of the first type receives a done indication from a processing engine, and 4) that outputs a go signal if a done indication has been received for all dispatched first instructions that are of the first type, wherein the first queue circuit does not store instructions of the second type and does not store instructions of the third type;
a second queue circuit: 1) that receives and stores instructions of the second type from the instruction loader, 2) that in response to receiving the go signal from the first queue circuit dispatches instructions of the second type to one or more processing engines, 3) that for each dispatched instruction of the second type receives a done indication from a processing engine, and 4) that outputs a go signal if a done indication has been received for all dispatched first instructions of the second type, wherein the second queue circuit does not store instructions of the first type and does not store instructions of the third type; and
a third queue circuit: 1) that receives and stores instructions of the third type from the instruction loader, 2) that in response to receiving the go signal from the second queue circuit dispatches instructions of the third type to one or more processing engines, 3) that for each dispatched instruction of the third type receives a done indication from a processing engine, wherein if a done indication has been received for all dispatched first instructions of the third type then an instructions done signal is output from the instruction dispatcher circuit to the instructing entity, wherein the third queue circuit does not store instructions of the first type and does not store instructions of the second type, and wherein the instructions done signal indicates that all the instructions of the set of first instructions have been performed.

2. The instruction dispatcher circuit of claim 1, wherein each of the first, second and third queue circuits comprises:
an instruction queue circuit;

instruction dispatch logic that determines which instructions should be dispatched and when they should be dispatched;
a done bit circuit comprising a plurality of done bits; and
go signal generating logic that is coupled to the plurality of done bits.

3. The instruction dispatcher circuit of claim 1, wherein each of the first, second and third queue circuits is self-packing.

4. The instruction dispatcher circuit of claim 1, wherein each of the first, second and third queue circuits is not self-packing.

5. The instruction dispatcher circuit of claim 1, wherein the first queue circuit receives from the instruction loader the first instructions of the first type and also the second instructions of the first type, and wherein the go signal is output by the first queue circuit if a done indication has been received for all dispatched first instructions of the first type regardless of whether a done indication has or has not been received onto the first queue circuit for any of the second instructions that may have been dispatched from the first queue circuit, wherein the second queue circuit receives from the instruction loader the first instructions of the second type and also the second instructions of the second type, and wherein the go signal is output by the second queue circuit if a done indication has been received for all dispatched first instructions of the second type regardless of whether a done indication has or has not been received onto the second queue circuit for any of the second instructions that may have been dispatched from the second queue circuit, wherein the third queue circuit receives from the instruction loader the first instructions of the third type and also the second instructions of the third type, and wherein the instructions done signal is output by the instruction dispatcher circuit if a done indication has been received for all dispatched first instructions of the third type regardless of whether a done indication has or has not been received onto the third queue circuit for any of the second instructions that may have been dispatched from the third queue circuit.

6. The instruction dispatcher circuit of claim 1, wherein the set of first instructions is communicated from the instructing entity to the instruction dispatcher circuit via a bus, and wherein the instructions done signal is communicated from the instruction dispatcher circuit to the instructing entity via the bus.

7. The instruction dispatcher circuit of claim 6, wherein the set of second instructions is also communicated via the bus to the instruction dispatcher circuit, and wherein an instructions done signal for the set of second instructions is also communicated out of the instruction dispatcher circuit via the bus.

8. The instruction dispatcher circuit of claim 1, wherein the instruction dispatcher circuit includes no code-executing processor that fetches and executes instructions.

9. The instruction dispatcher circuit of claim 1, wherein none of the instruction loader, the first queue circuit, the second queue circuit, and the third queue circuit executes any code.

10. The instruction dispatcher circuit of claim 1, wherein every instruction that passes into the instruction dispatcher circuit has a type field that indicates an instruction type.

11. The instruction dispatcher circuit of claim 1, wherein the first queue circuit dispatches instructions to a first processing engine but not to a second processing engine, wherein the second queue circuit dispatches instructions to the second processing engine but not to the first processing engine.

12. The instruction dispatcher circuit of claim 1, wherein the first queue circuit dispatches instructions in accordance with a dispatch rule, wherein the dispatch rule is programmable.

13. The instruction dispatcher circuit of claim 1, wherein the first queue circuit generates go signals in accordance with a go rule, wherein the go rule is programmable.

14. The instruction dispatcher circuit of claim 1, wherein at least some of the instructions dispatched by the instruction dispatcher are DMA (Direct Memory Access) instructions.

15. The instruction dispatcher circuit of claim 1, wherein the instructing entity is a processor that supplies instructions across a bus to the instruction dispatcher circuit.

16. The instruction dispatcher circuit of claim 1, wherein the instruction dispatcher circuit includes more than three queue circuits.

17. A method comprising:
(a) receiving from an instructing entity and onto an instruction dispatcher circuit a set of instructions, wherein the set of instructions includes one or more instructions of a first type, one or more instructions of a second type, and one or more instructions of a third type;
(b) storing instructions of the first type in a first queue circuit and dispatching instructions of the first type from the first queue circuit to one or more processing engines;
(c) storing instructions of the second type in a second queue circuit and dispatching instructions of the second type from the second queue circuit to one or more processing engines;
(d) storing instructions of the third type in a third queue circuit and dispatching instructions of the third type from the third queue circuit to one or more processing engines;
(e) receiving done indications onto the first queue circuit, wherein a done indication received in (e) indicates that a corresponding instruction dispatched by the first queue circuit has been performed;
(f) outputting a go signal from the first queue circuit if a done indication has been received for all dispatched instructions of the first type that have been dispatched from the first queue circuit, wherein the first queue circuit does not store instructions of the second type and does not store instructions of the third type;
(g) receiving done indications onto the second queue circuit, wherein a done indication received in (g) indicates that a corresponding instruction dispatched by the second queue circuit has been performed;
(h) outputting a go signal from the second queue circuit if a done indication has been received for all dispatched instructions of the second type that have been dispatched from the second queue circuit, wherein the second queue circuit does not store instructions of the first type and does not store instructions of the third type;
(i) receiving done indications onto the third queue circuit, wherein a done indication received in (i) indicates that a corresponding instruction dispatched by the third queue circuit has been performed;
(j) outputting an instructions done signal from the instruction dispatcher circuit if a done indication has been received for all dispatched instructions of the set, wherein the third queue circuit does not store instructions of the first type and does not store instructions of the second type; and (k) communicating the instructions done signal from the instruction dispatcher circuit to the instructing entity.

18. The method of claim 17, wherein the set of instructions is received in (a) from the instructing entity via a bus, and wherein the instructions done signal is communicated in (k) to the instructing entity via the bus.

19. The method of claim 17, wherein an instruction loader circuit receives the set of instructions in (a) and distributes the instructions to the first, second and third queue circuits.

20. The method of claim 17, wherein the instruction dispatcher circuit comprises more than three queue circuits.

21. An apparatus comprising:
an instruction loader that receives onto the apparatus a set of instructions, wherein the set of instructions includes instructions of a first type and instructions of a second type;
first means for: 1) receiving instructions of the first type from the instruction loader, 2) dispatching instructions of the first type, 3) for each dispatched instruction of the first type receiving a done indication, and 4) outputting a go signal if a done indication has been received for all dispatched instructions the first type, wherein the first means does not receive or store instructions of a second type, wherein the first means includes no processor that fetches and executes instructions; and
second means for: 1) receiving instructions of the second type from the instruction loader, 2) receiving the go signal from the first means and in response dispatching instructions of the second type, and 3) for each dispatched instruction of the second type receiving a done indication, wherein an instructions done signal is output from the apparatus if a done indication has been received for all dispatched instructions of the set, wherein the second means does not receive or store instructions of the first type, wherein the second means includes no processor that fetches and executes instructions, and wherein the instructions done signal indicates that all the instructions of the set of instructions have been performed.

22. The apparatus of claim 21, wherein each instruction received by the instruction loader includes an indication of instruction type, and wherein the instruction loader uses the indication of instruction type to determine where to forward the instruction.

23. The apparatus of claim 21, wherein the set of instructions is sent to the apparatus by an instructing entity, wherein a reference value is associated with the set of instructions, and wherein the reference value is sent back to the instructing entity thereby indicating to the instructing entity that the set of instructions has been completed.

24. The apparatus of claim 23, further comprising:
a bus target circuit that receives the set of instructions from the instructing entity and that passes the set of instructions to the instruction loader; and
a bus master circuit that sends the reference value back to the instructing entity.

* * * * *